US007258609B2

(12) United States Patent
Nordman et al.

(10) Patent No.: US 7,258,609 B2
**(45) Date of Patent: *Aug. 21, 2007**

(54) GAMING DEVICE HAVING DISPLAY WITH MULTIPLE RADIALLY TRANSLATING INDICATORS

(75) Inventors: Dennis Nordman, Lake Villa, IL (US); Bradley A. Hemerick, Sparks, NV (US); Daniel J. Waller, Reno, NV (US); Russell Chudd, Reno, NV (US)

(73) Assignee: IGT, Reno, NV (US)

(*) Notice: Subject to any disclaimer, the term of this patent is extended or adjusted under 35 U.S.C. 154(b) by 357 days.

This patent is subject to a terminal disclaimer.

(21) Appl. No.: 10/243,462

(22) Filed: Sep. 13, 2002

(65) Prior Publication Data

US 2004/0053687 A1 Mar. 18, 2004

(51) Int. Cl.
*A63F 9/24* (2006.01)
*A63F 13/00* (2006.01)

(52) U.S. Cl. ........................ 463/20; 463/16; 273/138.1; 273/138.2; 273/143 R

(58) Field of Classification Search ............ 463/30–32, 463/20–22, 13, 16, 26–27; 273/143 R, 138.1–138.2; 446/83, 103
See application file for complete search history.

(56) References Cited

U.S. PATENT DOCUMENTS 1,858,020 A * 5/1932 Linke .......................... 463/61
1,957,331 A * 5/1934 Fox et al. ................... 473/141
2,098,410 A * 11/1937 Williams ..................... 463/64
2,109,736 A * 3/1938 Roth .......................... 273/246
2,545,644 A 3/1951 Benton et al.
2,630,320 A * 3/1953 Francis ........................ 463/64
3,975,022 A 8/1976 Figueroa
4,410,178 A 10/1983 Partridge
4,695,053 A 9/1987 Vazquez, Jr. et al.

(Continued)

FOREIGN PATENT DOCUMENTS

EP 912685 12/1962

(Continued)

OTHER PUBLICATIONS

4DU Dice Unit Advertisement written by starpoint.uk.com, printed on Sep. 3, 2002.

(Continued)

*Primary Examiner*—Scott Jones
*Assistant Examiner*—Ryan Hsu
(74) *Attorney, Agent, or Firm*—Bell, Boyd & Lloyd LLP

(57) ABSTRACT

The present invention provides a mechanical display and indication for gaming devices. The display includes a set of symbols or indicia. The displays also cooperate with a plurality of radially spaced apart translating indicators, such as arrows. The indicators translate radially and sequentially, each pointing at one point towards a respective, associated symbol. The player can see each symbol and thus is able to know which symbols are relatively better than others. The radially translating indicators provide a random, visual element to the outcome, wherein the player watches the indicators sequentially point to different symbols until the motion stops, leaving a single or multiple indicated symbol (s), which is(are) provided in some fashion to the player.

33 Claims, 16 Drawing Sheets

U.S. PATENT DOCUMENTS

| | | | | |
|---|---|---|---|---|
| 4,732,386 | A | 3/1988 | Rayfiel | |
| 4,799,678 | A * | 1/1989 | Terzian et al. | 463/32 |
| 4,844,462 | A * | 7/1989 | Lubniewski | 463/6 |
| 5,152,529 | A | 10/1992 | Okada | |
| 5,364,100 | A | 11/1994 | Ludlow et al. | |
| 5,395,111 | A | 3/1995 | Inoue | |
| 5,449,173 | A | 9/1995 | Thomas et al. | |
| 5,560,603 | A | 10/1996 | Seelig et al. | |
| 5,584,763 | A | 12/1996 | Kelly et al. | |
| 5,664,998 | A * | 9/1997 | Seelig et al. | 463/20 |
| 5,823,872 | A | 10/1998 | Prather et al. | |
| 5,823,874 | A | 10/1998 | Adams et al. | |
| D400,597 | S | 11/1998 | Hedrick et al. | |
| D402,702 | S | 12/1998 | Seelig et al. | |
| 5,848,932 | A | 12/1998 | Adams | |
| D406,865 | S | 3/1999 | Heidel | |
| 5,882,261 | A | 3/1999 | Adams | |
| 5,911,418 | A | 6/1999 | Adams et al. | |
| 5,927,714 | A | 7/1999 | Kaplan | |
| 5,976,015 | A | 11/1999 | Seelig et al. | |
| 6,004,207 | A | 12/1999 | Wilson, Jr. et al. | |
| 6,059,658 | A | 5/2000 | Mangano et al. | |
| 6,086,066 | A | 7/2000 | Takeuchi et al. | |
| 6,089,977 | A | 7/2000 | Bennett | |
| 6,089,978 | A | 7/2000 | Adams et al. | |
| 6,105,962 | A | 8/2000 | Malavazos et al. | |
| 6,113,098 | A | 9/2000 | Adams | |
| 6,142,873 | A | 11/2000 | Weiss et al. | |
| 6,142,874 | A | 11/2000 | Kodachi et al. | |
| 6,159,098 | A | 12/2000 | Slomiany et al. | |
| 6,162,121 | A | 12/2000 | Morro et al. | |
| 6,173,955 | B1 | 1/2001 | Perrie et al. | |
| 6,203,429 | B1 | 3/2001 | Demar et al. | |
| D441,031 | S | 4/2001 | Seelig et al. | |
| 6,210,275 | B1 * | 4/2001 | Olsen | 463/16 |
| 6,213,876 | B1 | 4/2001 | Moore, Jr. | |
| 6,220,593 | B1 | 4/2001 | Pierce et al. | |
| 6,224,483 | B1 | 5/2001 | Mayeroff | |
| 6,227,970 | B1 | 5/2001 | Shimizu et al. | |
| D443,313 | S | 6/2001 | Brettschneider | |
| 6,251,013 | B1 | 6/2001 | Bennett | |
| 6,254,481 | B1 | 7/2001 | Jaffe | |
| 6,267,669 | B1 | 7/2001 | Luciano, Jr. et al. | |
| 6,270,411 | B1 | 8/2001 | Gura et al. | |
| 6,302,790 | B1 | 10/2001 | Brossard | |
| 6,305,686 | B1 | 10/2001 | Perrie et al. | |
| 6,315,663 | B1 | 11/2001 | Sakamoto | |
| 6,336,863 | B1 | 1/2002 | Baerlocher et al. | |
| 6,340,158 | B2 | 1/2002 | Pierce et al. | |
| 6,368,216 | B1 | 4/2002 | Hedrick et al. | |
| 6,386,974 | B1 | 5/2002 | Adams | |
| 6,406,369 | B1 * | 6/2002 | Baerlocher et al. | 463/20 |
| 6,419,579 | B1 | 7/2002 | Bennett et al. | |
| 6,461,241 | B1 | 10/2002 | Webb et al. | |
| D465,531 | S | 11/2002 | Luciano, Jr. et al. | |
| 6,481,713 | B2 | 11/2002 | Perrie et al. | |
| 6,533,660 | B2 | 3/2003 | Seelig et al. | |
| 6,537,152 | B2 | 3/2003 | Seelig et al. | |
| 6,582,307 | B2 | 6/2003 | Webb | |
| 6,609,972 | B2 | 8/2003 | Seelig et al. | |
| 6,712,694 | B1 | 3/2004 | Nordman | |
| 6,758,473 | B2 * | 7/2004 | Seelig et al. | 463/20 |

FOREIGN PATENT DOCUMENTS

| | | | |
|---|---|---|---|
| GB | 2353128 | A * | 2/2001 |
| GB | 2393026 | A * | 3/2004 |
| WO | WO 02/32525 | | 4/2002 |
| WO | WO 2004/025587 | | 3/2004 |
| WO | WO 2004/086318 | | 10/2004 |

OTHER PUBLICATIONS

American Bandstand Brochure written by Anchor Games, published in 2001.
Big Shot!™ Advertisement published by Aristocrat Technologies, Inc., published in 2002.
Big Top Keno Advertisement published by Aristocrat Technologies, Inc., published in 2000.
Bonus Roulette Brochure written by F. Franco, not dated.
Buck's Roulette Brochure written by R. Franco, not dated.
Chariot's of Fortune Brochure written by R. Franco, not dated.
Classic Pot of Gold Brochure written by Ace Coin Equipment Ltd., not dated.
Cyberdyne Gaming Brochure written by Cyberdyne Gaming, not dated.
Elvira® Mistress of the Dark™ Advertisement written by IGT, published in 2002.
Elvis Hits Advertisement written by IGT, published in 1999.
Holy Smoke Brochure written by Impulse Gaming Ltd., not dated.
Jack and the Beanstalk™ Brochure written by AC Coin & Slot, not dated.
King of the Grill™ Brochure written by AC Coin & Slot, not dated.
Line-Up Brochure written by AC Coin & Slot, not dated.
Little Green Men Jr.™ Advertisement written by AC Coin & Slot, not dated.
Little Green Men Jr.™ Article written by Strictly Slots, published in Feb. 2003.
Miss America Brochure written by AC Coin & Slot, not dated.
Mix and Match Article written by Strictly Slots, published in Apr. 2002.
Mix and Match Advertisement published by AC Coin & Slot, not dated.
Money Grab Article written by Strictly Slots, published in Apr. 2001.
Monster Match Article written by Strictly Slots, published in Jan. 2002.
On The Money! Article written by Strictly Slots, published in Dec. 2000.
Payout!™ Advertisement written by www.csds.com/Gaming/Products/g_Payout.htm, printed on Jan. 15, 2001.
Payout!™ Article written by Casino Data Systems, not dated.
Pick a Prize Brochure written by Acres Gaming Incorporated, published prior 2001.
Power Slotto Brochure published by AC Coin & Slot prior to 2002.
Press Your Luck Brochure published by AC Coin & Slot prior to 2002.
Quick Pick Paytime Brochure written by Acres Gaming Incorporated, published prior to 2001.
R&B™ Brochure published by AC Coin & Slot, not dated.
Reel Dice Advertisement written by Gerber & Glass, published in 1936.
Royal Roulette Brochure written by Impulse Gaming Ltd., not dated.
Slot Machine Buyer's Handbook, A Consumer's Guide to Slot Machines written by David L. Saul and Daniel R. Mead; published in 1998.
Silver City Roundup Brochure published by AC Coin & Slot, not dated.
Slot Machines A Pictorial History of the First 100 Years, 5th edition written by Marshall Fey, published in 1983-1997.
Slot Machines on Parade, 1st edition written by Robert N. Geddes and illustrated by Daniel R. Mead, published in 1980.
Spin-A-Lot Brochure written by Acres Gaming Incorporated, published prior to 2001.
Take Your Pick Article written by Strictly Slots, published in Mar. 2001.
Yahtzee Bonus Advertisement written by Mikohn, published in 1999.

* cited by examiner

GAMING DEVICE HAVING DISPLAY WITH MULTIPLE RADIALLY TRANSLATING INDICATORS

BACKGROUND OF THE INVENTION

The present invention relates to gaming devices. More particularly, the present invention relates to wagering gaming device displays.

Gaming devices provide fun and excitement to the player. Gaming, in general, provides an escape from the everyday rigors of life. Gaming devices and gaming establishments use bright lights and exciting sounds to set the gaming world apart from the rest of the world. Gaming devices, in particular, use one or more displays that enable the player to see and play the game. The displays typically portray the action of the game and ultimately indicate whether or not the player wins.

Slot machine displays have gone through a number of transitions since their inception in the late 1800's. Originally, slot machines displayed purely mechanical reels. While these machines gained enormous popularity, the mechanical nature of the reels limited the number of paystops, which limited the number of different symbols and the number of different winning symbol combinations.

The advent of the computer and the video monitor expanded the possibilities for gaming devices. There are now video poker, video blackjack and other types of video gaming machines. Video displays have also been implemented in slot machines. The video slot machines use computers to randomly generate symbol combinations from an expanded number of different symbols. Video reel strips can include a virtually unlimited number of symbols, which enables a wide variety of different symbol combinations to be employed, including combinations that appear very infrequently and yield high payouts.

With slot machines, the video monitors have also been used to provide bonus or secondary games. Bonus games have become much more prevalent and elaborate in recent years. Players play the base game of slot until becoming eligible for a bonus game. The base game temporarily pauses, while the player plays the bonus game. When the player completes the bonus game, the gaming device returns the player to the base, slot game.

It should therefore be appreciated that a single video monitor is often sufficient to provide both the base game of slot and one or more bonus games that become triggered by the slot game. As seen in FIG. 1B, there is room on the gaming device 10*b* for an upper display area 32. This area, however, is often not used for gaming purposes and may simply provide a graphic and/or lettering that pertains to a theme of the gaming device.

Video monitors and in particular video-based slot machines are likely going to continue growing in popularity. As the video monitor has been used more and more, however, there has been a growing sentiment that some of the mystique of the old time mechanical gaming devices is lost when mechanical reels and mechanical displays are replaced by a video monitor. Manufacturers have attempted to create a nostalgic feeling in gaming devices, for example, by implementing "ding, ding" sounds (i.e., credit roll-up sounds) to simulate the sound of coins hitting a tray (when the gaming device is in reality incrementing an electronic credit meter).

Accordingly, a need exists to provide a gaming device that may use a video monitor, which provides increased flexibility to the gaming device to add more symbols and more elaborate bonus games, while providing some aspect of the gaming device that is mechanical and provides a fun and exciting mechanical display.

SUMMARY OF THE INVENTION

The present invention provides a mechanical display and indication for wagering gaming devices. The present invention includes various embodiments, each of which have a number of common elements. First, the embodiments each include a set of symbols or indicia such as conventional gaming symbols, values or value symbols, prizes or prize symbols, awards or award symbols, or credits or credit symbols. Second, each of the embodiments include a plurality of radially spaced apart translating or oscillating indicators such as arrows. The indicators translate or oscillate radially and sequentially, each pointing at one point towards a respective, associated symbol. The player can see each symbol and thus is able to know which symbols are relatively better than others. The radially translating indicators provide a random, visual element to the outcome, wherein the player watches the different indicators sequentially point to different symbols until the motion stops, leaving a single indicated symbol, which is provided in a suitable fashion to the player.

The gaming devices operable with the present invention include but are not limited to the games of slot, poker, keno and blackjack. The display and indicators of the present invention operate with the base games of slot, poker, keno and blackjack and/or any bonus game, bonus triggering event, progressive game or any other type of secondary game thereof. The display and indicators can be constructed of any suitable material(s), such as metal, plastic, wood and any combination thereof.

In one preferred embodiment, the display and indicators of the present invention operate with the primary game of slot and in particular a bonus game that operates in conjunction with slot. That is, one or more indicators of the present invention point to or indicate an award provided to the player that is in addition to the winnings from the regular slot game. The symbols indicated by the display can, for example, represent any suitable type of award or benefit for the player, such as base game credits, a multiplier of a base game credit, a number of picks from a prize pool or a number of free spins or free games. The indicia or symbol can also signal the player's entry into a bonus game or into a different area or part of the base game.

In one preferred embodiment of the present invention, the symbols are each provided by an independently operated symbol display. Each of the plurality of symbol displays is controlled by the processor and is operated to display a plurality of different symbols such as award or credit values. In one embodiment, the symbol displays are conventional LED devices, although it should be appreciated that the symbol displays may be any suitable display devices, including but not limited to video monitors, wheels, reels and the like. The symbol displays facilitate the change of the symbols. The change of the symbols could be randomly determined, predetermined, based on different award levels or determined in any other suitable manner.

For purposes of describing the present invention, the term symbol includes any suitable symbol such as conventional gaming device symbols or images such as a number of credits, an award, a prize value, letters or playing cards.

In one primary embodiment of the present invention, the display includes a number of radially spaced apart symbols. For example, the symbols can appear as numbers on a clock, albeit having different amounts than one to twelve. An indicator, such as an arrow is provided for each symbol. The indicators are positioned to point radially outward toward the symbols. The player viewing the display of the present invention sees the symbols and the indicators.

The display can be mounted in any suitable position on the front, sides or top of the cabinet of the gaming device. In one embodiment, the display includes a cam and a series of cam followers, one follower for each indicator mounted in the cabinet. The display also defines radially spaced apart grooves, one groove for each indicator and follower. Each follower includes a connector that extends through one of the grooves and is attached to one of the indicators. In this embodiment, the followers are spring-loaded and biased to be normally in a non-indicating position, wherein the indicators are positioned a furthest possible position away from the respective symbols. The cam is attached to an axis of rotation or camshaft located at the radial center between the symbols. The cam has any suitable shape desired by the implementor, such as an egg shape, that biases some of the indicators partially radially towards the respective symbols and one of the indicators to an indication position, closest to one of the symbols.

In one embodiment, the cam includes protrusions or extensions that make certain of the indicators appear to wiggle. The cam and followers produce a cyclical, repeatable motion of the indicators, wherein the player viewing the display can learn the pattern and can predict which follower or indicator will begin to move next. The camshaft is connected to an actuator such as a motor, and specifically such as a stepper motor, which precisely controls the acceleration, velocity and position of the cam and therefore controls precisely the relative positions of the indicators with respect to the symbols.

In another embodiment, a different cam arrangement is employed using a circular cam and a connection point on the cam spaced radially away from the center of the circular cam. The connection point includes the connection or each of a set of members extending from the point to the respective indicators. As the circular cam rotates, the connection point circumferentially moves about the center of the cam. The members and indicators are simultaneously directed or pushed toward and directed or pulled away from their respective symbols. The indicators translate along radially spaced apart or spoked grooves in the panel of the gaming device, as with the previous embodiment. The indicators are in constant motion and are either moving sequentially toward or away from the symbols.

In one alternative embodiment, the drive mechanism of the cam and followers is replaced by separate stepper motors, one for each indicator. In such embodiments, the stepper motors are linear stepper motors or alternatively can be rotational motors that are connected respectively to lead screw arrangements. In either case, the stepper motors drive connectors that are attached through the grooves in the panel to the indicators in the same manner as the followers in the cam driven embodiment. In the case where lead screws are employed, the connectors include mating threads that thread onto the lead screws.

This multiple stepper motor embodiment facilitates independent control of each of the indicators. The indicators can be of any suitable desired shape, such as arrows, stars or lightning bolts. In one embodiment, the indicators are part of a three-dimensional object, for example, the tentacles of an octopus. The stepper motors provide the implementor with the ability to move the tentacles individually and independently at different speeds and at different accelerations. The result is a very entertaining three-dimensional display. Unlike the cam embodiment, any of the tentacles or indicators can reside in any position between a fully non-indicating position and a fully indicating position at any suitable time.

In each of the above-described embodiments, after a period of time, the motion of the indicators stops and one indicator is left closest to its respective symbol. The gaming device uses the indicated symbol in some manner, such as providing a number of base game credits to the player, providing a number of free games or free spins, providing a number of picks from a prize pool, allowing the player to enter a bonus game, incrementing a progressive jackpot and any combination thereof.

Additional features and advantages of the present invention are described in, and will be apparent from, the following Detailed Description of the Invention and the figures.

DETAILED DESCRIPTION OF THE INVENTION

The present invention provides a display and display indicators that operate with a wagering game such as slot, poker, keno and blackjack. In an embodiment, the display and indicators operate in conjunction with bonus games, which in turn operate in conjunction with the base games of the wagering gaming device such as slot, poker, keno and blackjack. Besides the base and bonus games, the present invention can operate with any of the bonus triggering events, as well as any progressive game coordinating with these base games. The symbols and indicia used for any of the base, bonus and progressive games include mechanical, electrical or video symbols and indicia.

Figure 1A:
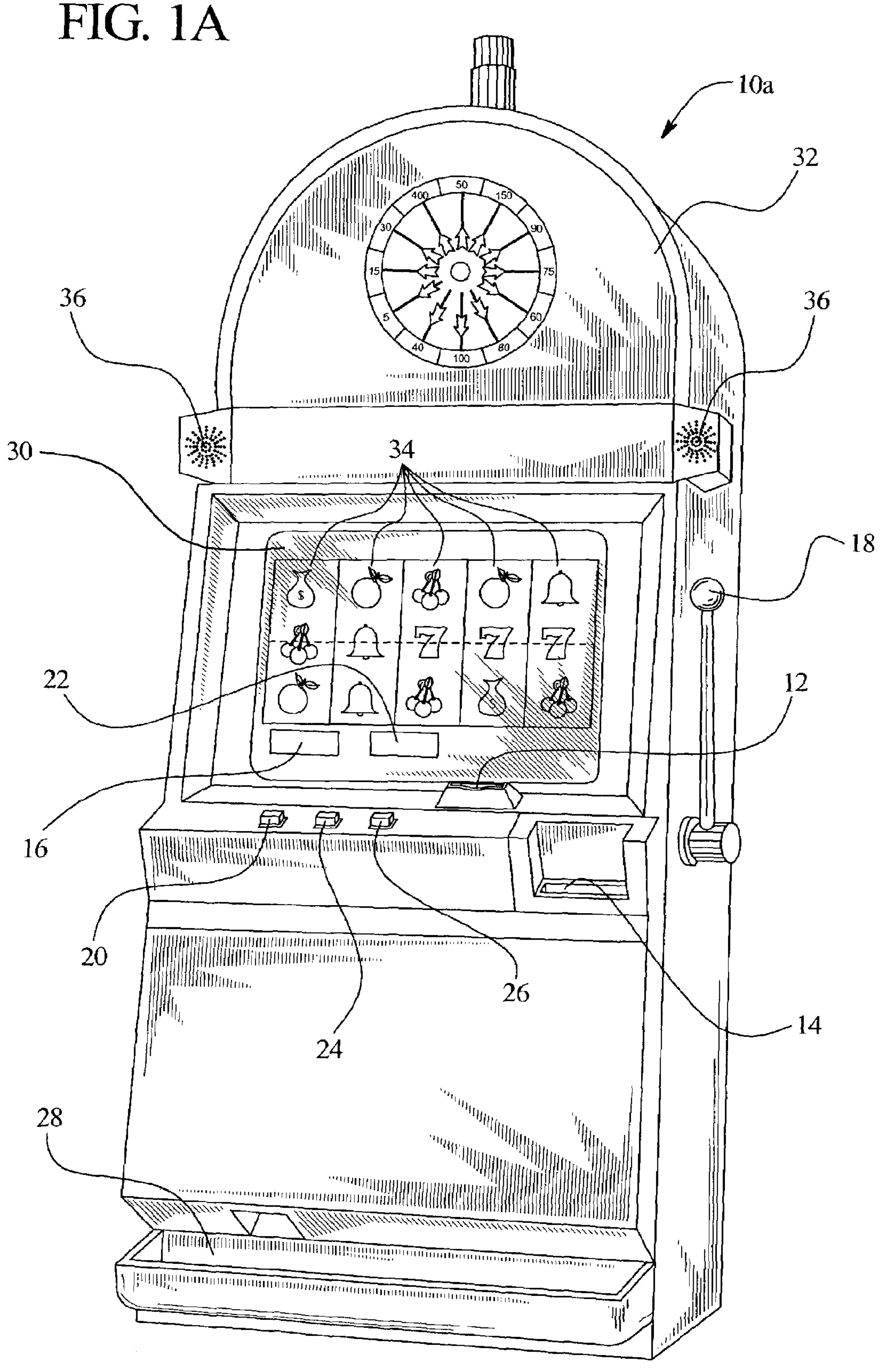
FIGS. 1A and 1B are perspective views of alternative embodiments of the gaming device of the present invention.
Figure 1B:
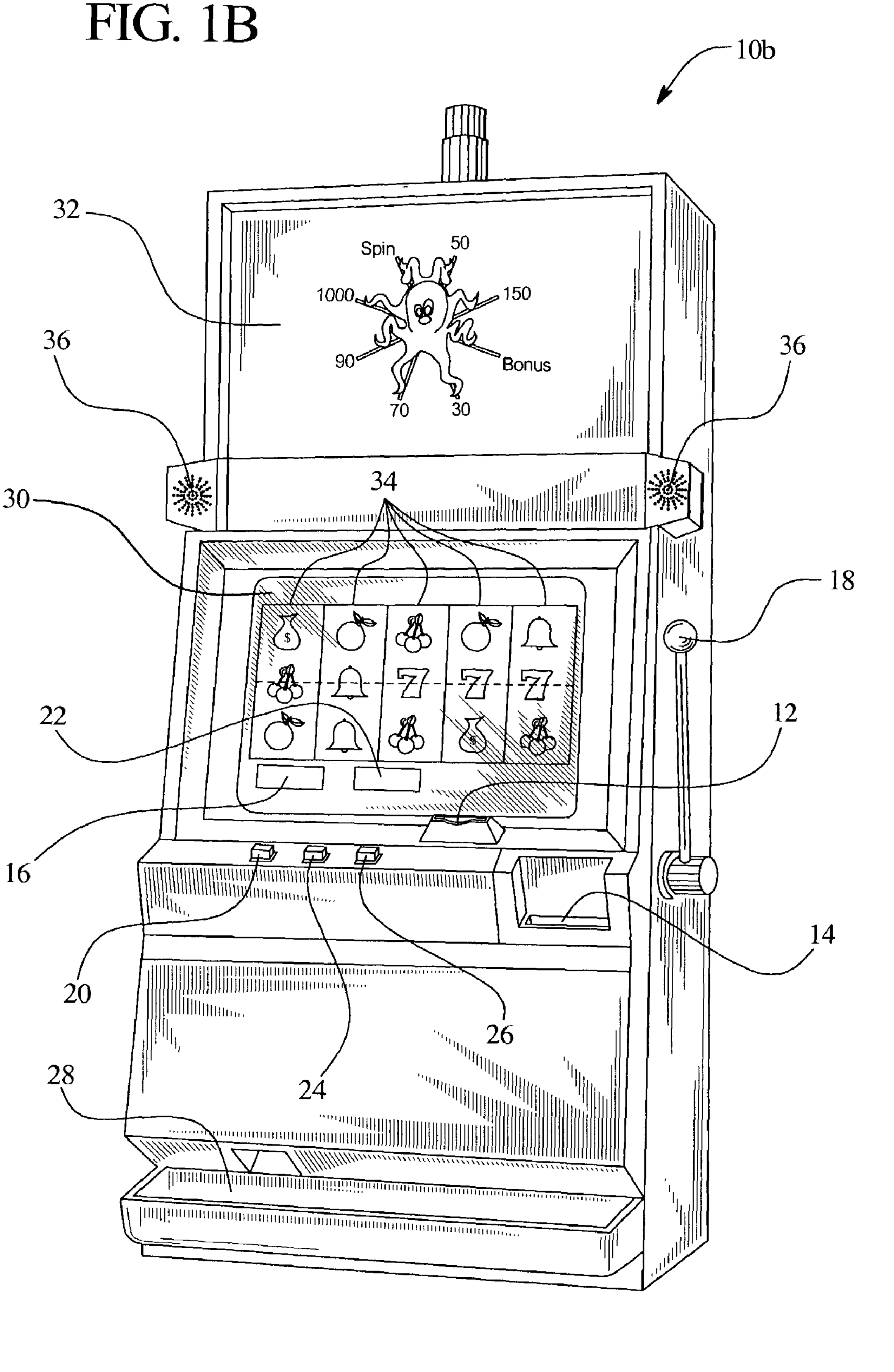

One primary embodiment for the display and display indicators is with the game of slot. Referring now to the drawings, and in particular to FIGS. 1A and 1B, one slot machine embodiment is illustrated. Gaming devices 10*a* and 10*b* illustrate two possible cabinet styles and display arrangements and are collectively referred to herein as gaming device 10. Gaming device 10 is illustrated as having the controls, displays and features of a conventional slot machine, wherein the player operates the gaming device while standing or sitting. Gaming device 10 also includes being a pub-style or table-top game (not shown), which a player operates while sitting.

Gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. A player may cash out by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more display devices. The embodiments shown in FIGS. 1A and 1B include a display device 30 and an upper display area 32. The display device 30 includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The display and display indication of the present invention is provided, in an embodiment, in the upper display area 32 of gaming device 10*a* and 10*b* of FIGS. 1A and 1B. The display and display indication of the present invention is provided, in another embodiment, on top of the rounded cabinet of gaming device 10*a* or rectangular cabinet of gaming device 10*b*. In a further embodiment, the top portion or top box of the gaming device is removed, creating a lower profile machine. Here, the display and display indication of the present invention sits on top of gaming device 10 but is lower to the ground than if the top box is not removed.

The slot machine embodiment of gaming device 10 includes a plurality of reels 34, for example three to five reels 34. Each reel 34 includes a plurality of indicia such as bells, hearts, fruits, numbers, letters, bars or other images which correspond to a theme associated with the gaming device 10. If the reels 34 are in video form, the display device displaying the video reels 34 is, in one embodiment, a video monitor. Gaming device 10 also preferably includes speakers 36 for making sounds associated with the gaming device or play thereof or playing music.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. The gaming device 10 employs a video-based display device 30 or 32 for the bonus games. The bonus games include a program that automatically begins when the player achieves a qualifying condition in the base game.

Figure 2:
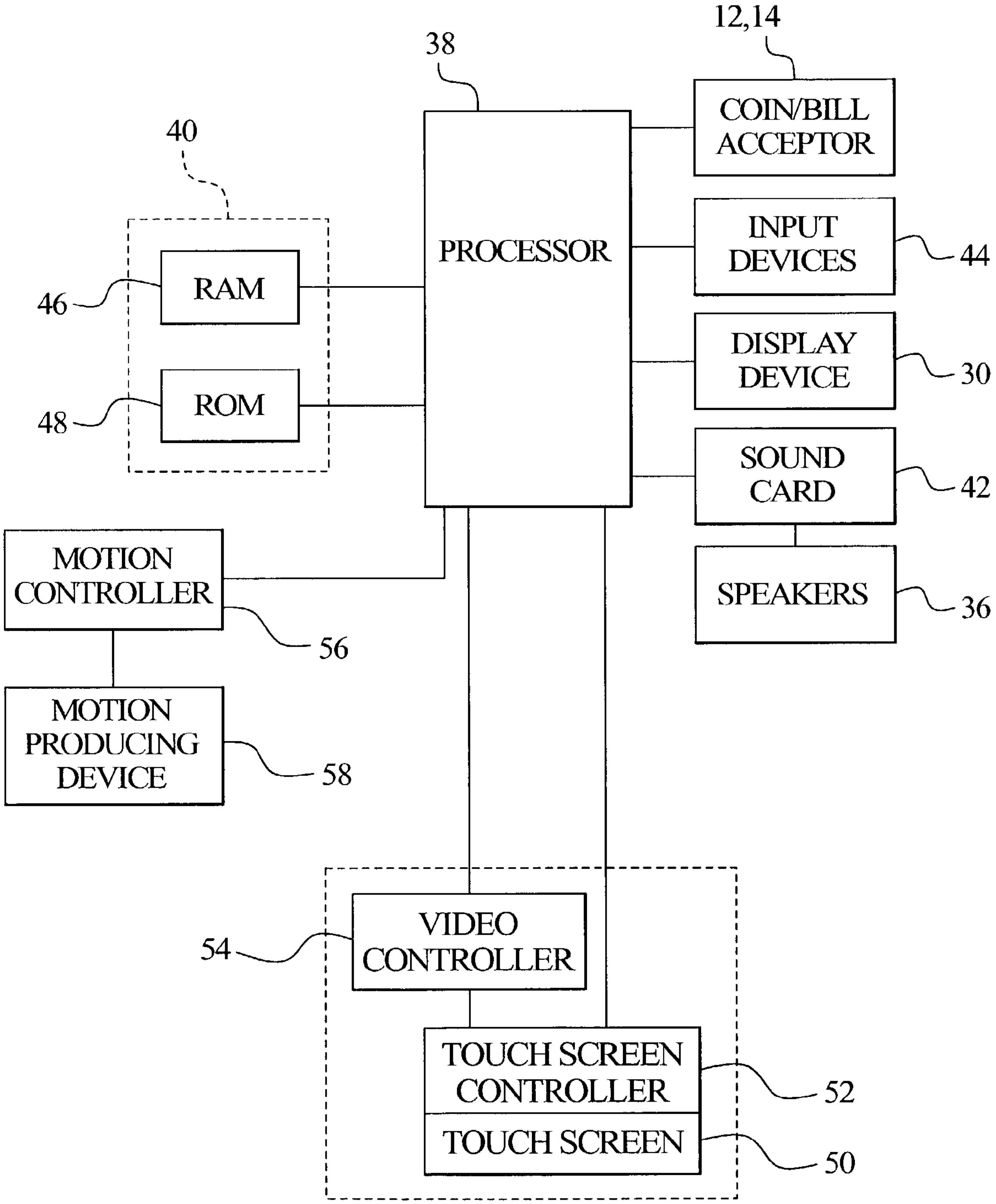
FIG. 2 is a schematic block diagram of the electronic configuration of one embodiment of the gaming device of the present invention.

Referring now to FIG. 2, one embodiment of an electronic configuration for gaming device 10 includes: a processor 38; a memory device 40 for storing program code or other data; a display device 30; a sound card 42; a plurality of speakers 36; and one or more input devices 44. The processor 38 includes a microprocessor based platform that is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player uses the input devices 44 to input signals into gaming device 10. In the slot machine base game, the input devices 44 include the pull arm 18, play button 20, the bet one button 24, the cash out button 26 and other player inputs. A touch screen 50 and touch screen controller 52 are connected to a video controller 54 and processor 38. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money to start the game.

The processor 38 also controls the output of one of more motion controllers 56 that control one or more actuators or motion producing devices 58. The motion producing devices 58 can be any suitable combination of motors, stepper motors, linear stepper motors or other types of linear actuators. The motion controllers 56 typically include printed circuit boards or standalone enclosures that receive high level commands from the processor 38. The motion controller 56 converts the high level commands, for example, into a number of step pulses, which in turn are converted into motor currents. The stepper motor or other type of motion producing device 58 receives the currents, wherein the currents cause, for example, a rotor to turn within a stator a precise and desired amount.

As described more fully below, the rotational motion of a motor 58 can be used to rotate a portion of the display or indicator of the present invention. The rotational motion can alternatively be converted to cause a portion of the display or indicator to translate. Otherwise, a linear motion producing device 58 can be used to directly cause a portion of the display or indicator of the present invention to translate.

The motion control scheme facilitates complex movements of multiple parts to be programmed into the memory device 40 and carried out by the processor 38 at the appropriate time in the sequence of the game, be it a base, bonus, bonus triggering or progressive sequence of gaming device 10. Moreover, multiple programs can be implemented in the memory device 40, wherein the processor runs the appropriate program at the appropriate time, and wherein the displays and indicators described below can perform or move differently, such as faster, slower or in different directions at different times or points in the game. The motion control programs, in one embodiment, interface with one or more random generation devices, typically software based items, to produce randomly displayed outcomes on the displays and indicators of the present invention.

Figure 3:
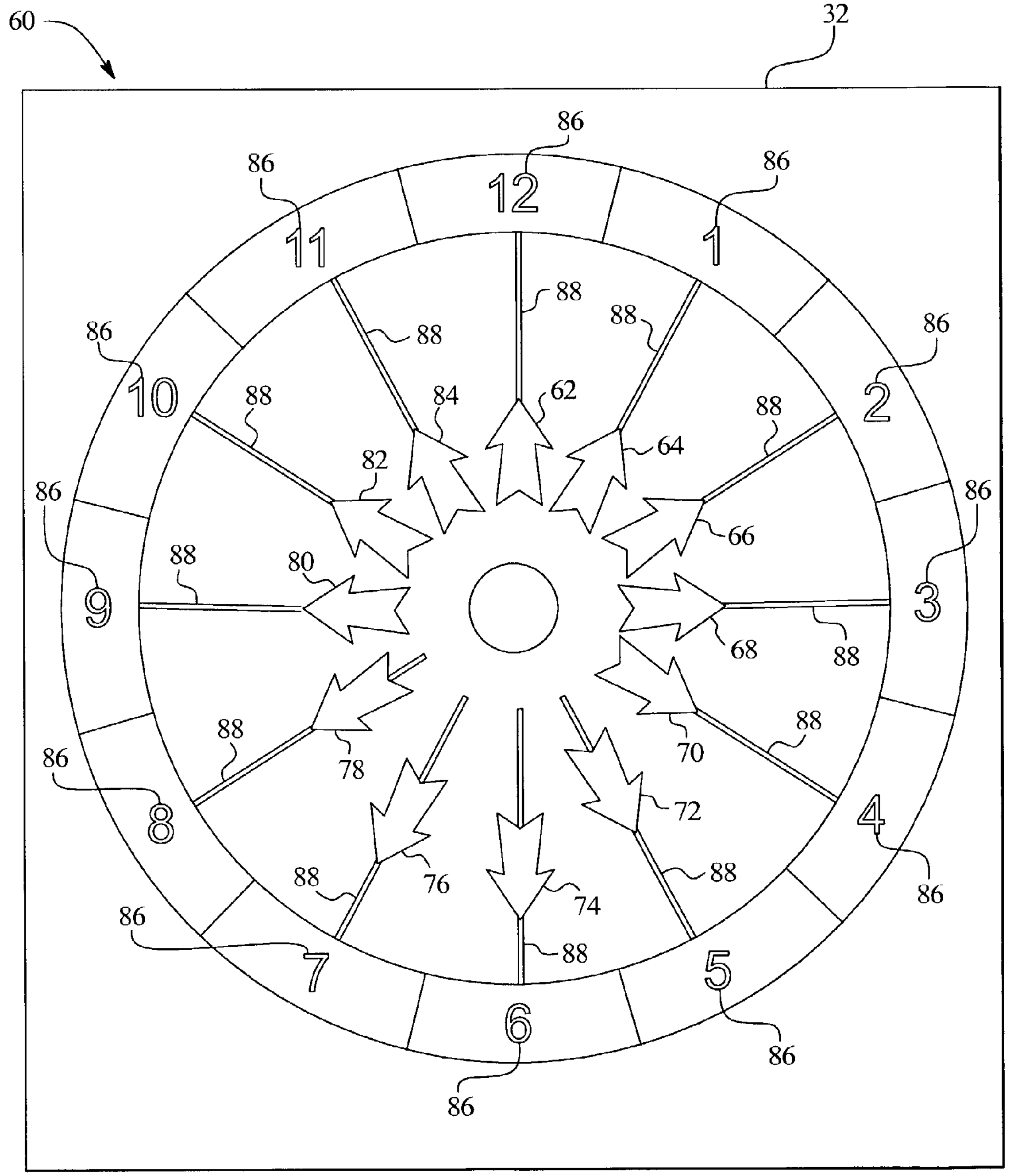
FIG. 3 is a front elevation view of one embodiment of the display with multiple radially translating indicators of the present invention.

Referring now to FIG. 3, one embodiment of a display 60, having multiple translating indicators 62 to 84 is illustrated. Each of the indicators 62 to 84 translates radially towards and away from a respective symbol 86. The symbols 86 are illustrated in a spatially related format, being for example the numbers on the face of a clock or a watch. The symbols in one embodiment can have any suitable value and any value distribution on the display 60. The symbols can be numbers as illustrated, or include one or more letters and designate types of awards other than monetary awards. The symbols 86 can represent a number of credits, a multiplier value, a number of picks from a prize pool, a progressive game incrementation, or any other type of benefit desired by the game implementor. The symbols 86 can alternatively be a number of free spins or free games or allow the player to enter a bonus round of gaming device 10.

The display 60 in an embodiment is mounted on the upper display area 32 illustrated in FIGS. 1A and 1B. In an alternative embodiment, the display 60 is mounted on a separate enclosure that is mounted to the top of the cabinet of the gaming device 10. In another embodiment, the top or top box of gaming device 10 is removed and the display 60 is mounted on top of the machine but has a lower profile than if mounted on top of the machines 10*a* and 10*b* illustrated in FIGS. 1A and 1B, respectively.

Each of the indicators 62 to 84 translates radially along a slot 88. The panel of upper display area 32 defines the slots. The panel of the upper display area 32 can be metal, plastic, wood, etc., and can have indicia and other items designed to hide, cover or de-emphasize the slots 88. The display and indicators can be constructed of any suitable material(s), such as metal, plastic, wood and any combination thereof.

Figure 4:
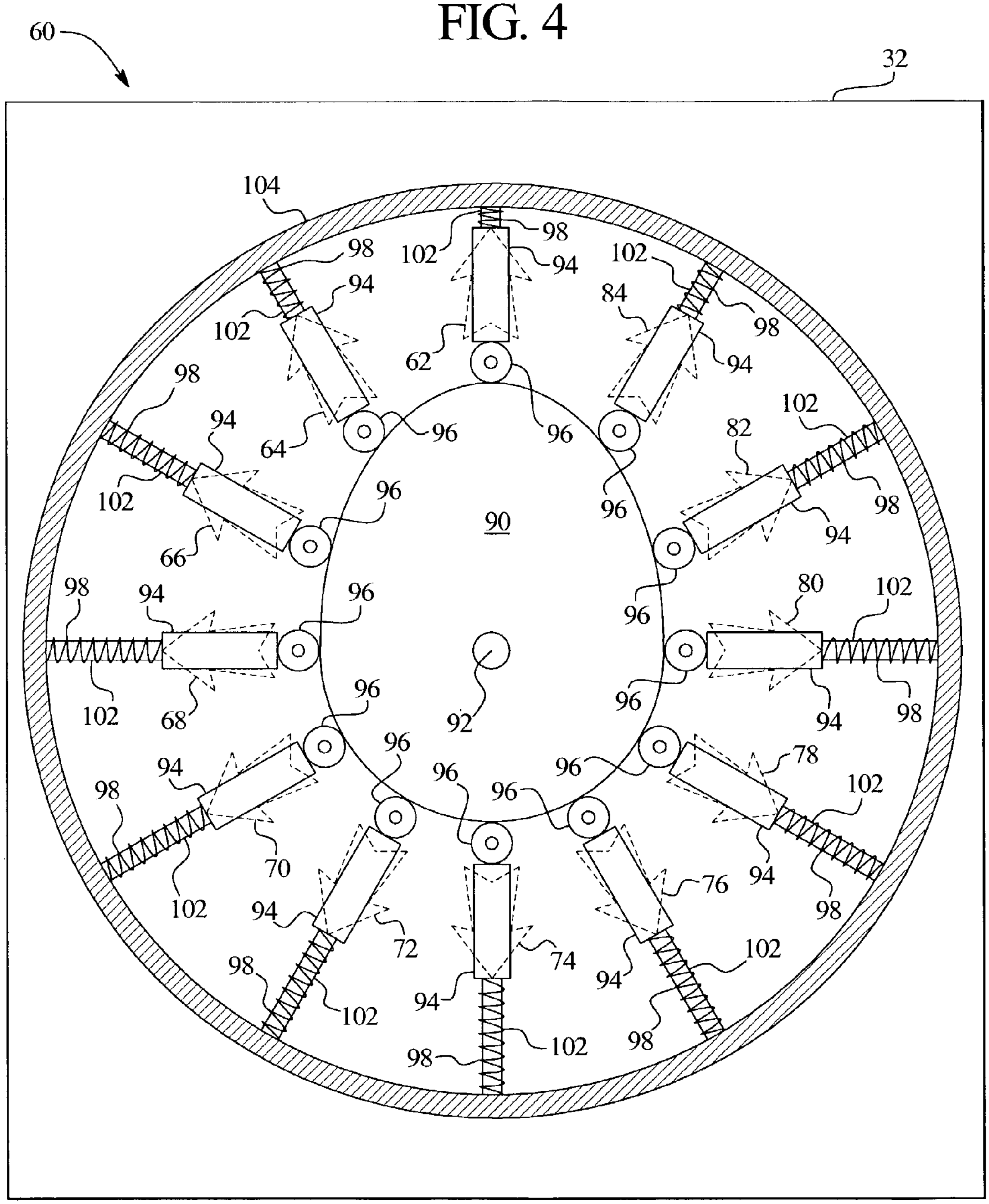
FIG. 4 is a rear elevation view of the display of FIG. 3.

Referring now to FIG. 4, the display 60 of FIG. 3 is illustrated from the reverse side, i.e., from the inside of gaming device 10. The components that drive the indicators 62 to 84 are disposed directly behind the panel of the upper display area 32 in an embodiment. Each of the indicators 62 to 84 is illustrated in phantom because the indicators reside on the front side of the display 60 as illustrated if FIG. 3 and are not viewable from the view of FIG. 4.

The display 60 includes a cam 90. The cam 90 illustrates one possible shape and thus one possible motion profile for the display 60 of the present invention. The cam 90 is attached to a camshaft 92 which is driven by a motion producing device 58 (FIG. 2, not illustrated in FIG. 4). In one embodiment, the motion producing device 58 is a stepper motor. Stepper motors are known in the art as devices that enable acceleration, velocity and positional data for the motor to be programmed into software. The software sends high level commands to the motion controller 56, which outputs motor currents to the motion producing device 58, i.e., the stepper motor.

The present invention can use one or more stepper motors having a rotational or translational output. In the illustrated embodiment, the camshaft 92 of the display 60 is mounted via a motor coupler (not illustrated) to a rotational stepper motor. The motor coupler in an embodiment has a spring portion that allows for slight misalignment between the shaft of the stepper motor and the camshaft 92.

Each of the indicators 62 to 84 is mounted via a connector (FIG. 15) through the slots 88 (not seen) to a movable cylinder 94. The cylinder 94 is pivotally connected to a cam follower 96. Cam follower 96 provides for a smooth operating interface between the surface of the cam 90 and the moveable cylinders 94. The cylinders 94 are sized to have an inside diameter that is slightly larger than an outside diameter of a stationary piston 102.

Pistons 102 provide support for a spring 98. The springs 98 are sized and selected so as to provide a sufficient amount of force to push the cylinder 94 and follower 96 against the cam 90. The springs bias against a wall 104 affixed to the panel of the upper display area 32. The springs 98 can alternatively be housed on the inside of the cylinders 94.

As discussed above, the cylinders 94 attach to connectors (FIG. 15) that extend through the slots 88 illustrated in FIG. 3. The connectors connect through the slots 88 to the indicators 62 to 84. The slots 88 and connectors dictate that the piston cylinder assemblies are fixed in a predetermined radial relationship to the cam 90.

In the illustrated embodiment, the cam 90 is oblong or egg-shaped so that when cam 90 rotates about the access or camshaft 92, certain of the cylinders 94 and the corresponding indicators are more biased than others against the springs 98, which are held in place by the pistons 102. In the illustrated embodiment, the cylinder 94 and the corresponding indicator 62 are pushed a maximum distance towards the wall 104. On the front face of the panel of the upper display area 32, the indicator 62 appears closest to its associated symbol 86. The indicators 64 and 84 that are most closely adjacent to the indicator 62 are biased towards their respective symbols 86 a distance slightly less than the distance of the indicator 62. The indicators 66, 68, 80 and 82 are biased by the cam 90 even less than the adjacent indicators 64 and 84.

The bottom of cam 90 is virtually circular, which results in the indicators 70, 72, 74, 76 and 78 all being at substantially equal distances from their respective symbols 86. The cam driven display 60 produces an effect, wherein the indicators 62 to 84 are in constant motion except where the radius of the cam does not change over a period of degrees. It should be appreciated that the cam 90 can be rotated in either direction, stopped, reversed, and accelerated at any rate to achieve any velocity capable by the stepper motor.

Figure 5:
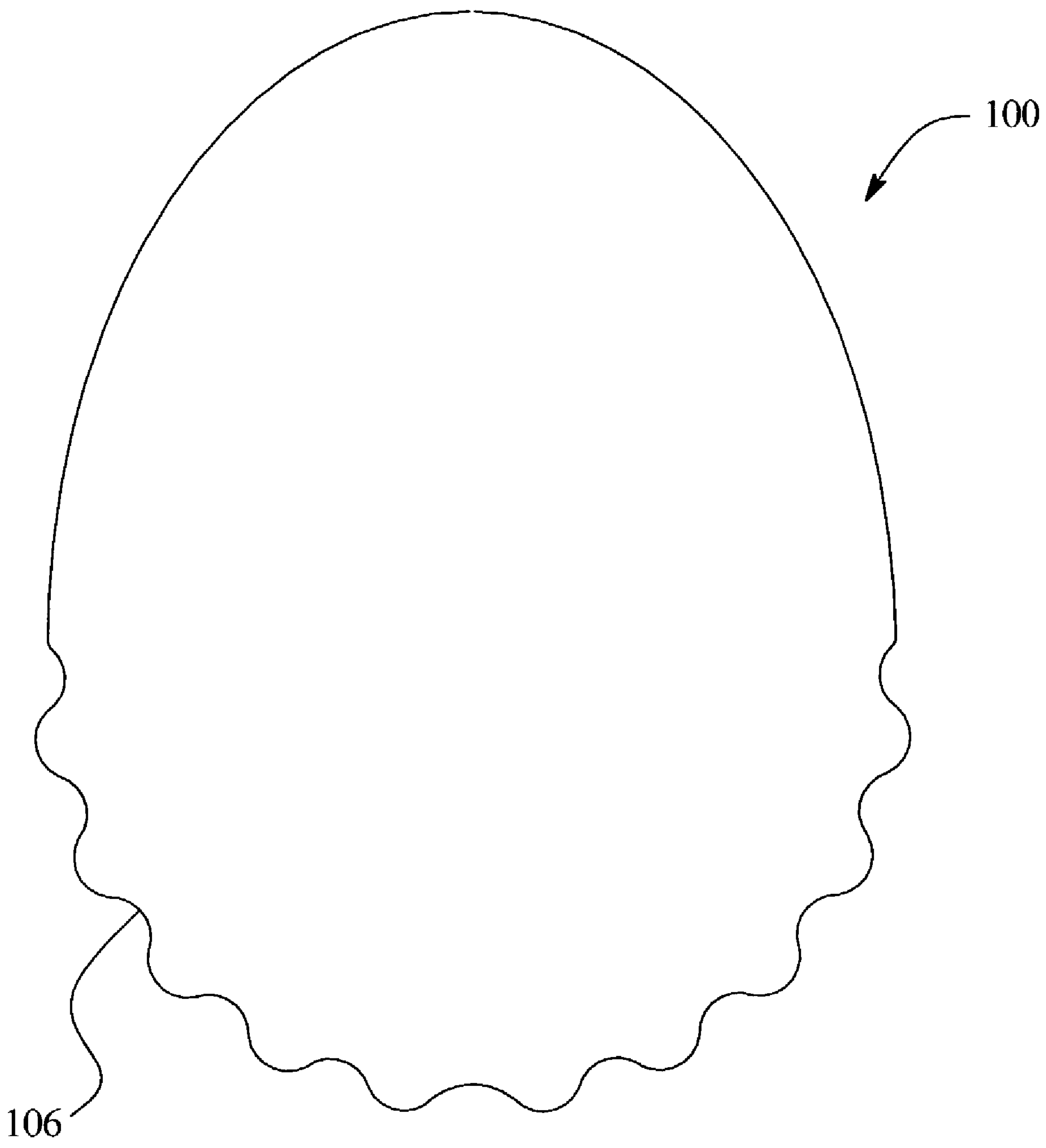
FIG. 5 is an elevation view of one embodiment of an alternative wiggle cam of the present invention.
Figure 6:
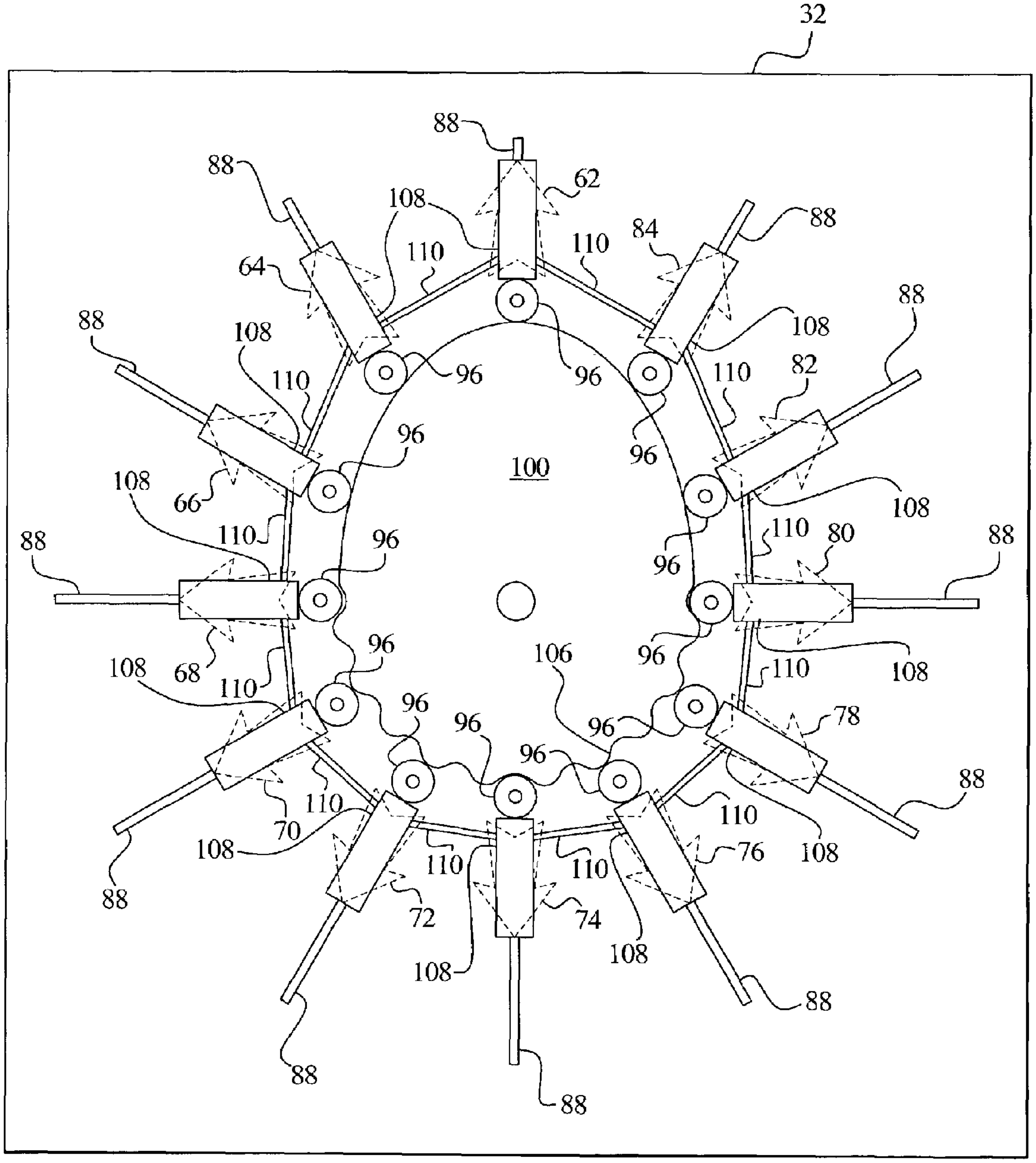
FIG. 6 is a rear elevation view of the display of the present invention utilizing the wiggle cam of FIG. 5 instead of the cam portion illustrated in FIG. 4.

Referring now to FIGS. 5 and 6, the circular portion or another portion of the cam can be replaced in an embodiment by a cam 100 having at least a portion that includes multiple protrusions and indentations 106. The protrusions and indentations 106 are sized to receive the followers 96 connected pivotally to the cylinders 94. It should therefore be appreciated that instead of producing a smooth circular motion at the side opposite the point of the egg-shaped cam 90, the alternative cam 100 produces an oscillating, wavy or wiggly motion. That is, the piston and cylinders oscillate or wiggle slightly as the followers ride over the protrusions and indentations 106. The result is that the indicators appear to shake and move back and forth, i.e., oscillate, until the smooth pointed portion of the egg-shaped cam rotates to push the indicators towards the indicating position, i.e., closest to the respective symbol 86.

FIG. 6 also illustrates an alternative embodiment for keeping the cam followers held firmly against the shape of the cam 100. The indicators 62 to 84 are illustrated in phantom again because they reside on the opposite side of the surface of the upper display area 32. The mechanical arrangement for the cam 100 also includes the followers 96 as described above. The followers 96 pivotally connect to cylinders 108. The cylinders 108 attach to the indicators 62 to 84 through slots 88 as described above with respect to the cam 90.

The cam 100 in FIG. 6 uses a band 110 to hold the cylinders 108 taught against the cam 90. The band 110 can be any stretchable material such as thin metal, rubber, a polymer material, which is strong and slightly deformable. The band 110 does not break or rupture after repeated stretching in different directions. The band 110 holds the connectors and associated cam followers 96 tightly against the surface of the wiggle cam 100. The band 110 also holds the followers tightly against the protrusions and indentations 106 of the wiggle cam portion of the wiggle cam 100.

The band 110 is connected to or contacts a hook or other type of protrusion (underneath cylinders 108 and not seen in FIG. 6) extending from the cylinders 108. The panel of the upper display area 32 in FIG. 6 also illustrates the slots 88 that extend radially outward from the wiggle cam 100. The slots 88 provide the track or path that the cylinders 108 and thus the indicators follow when the wiggle cam 100 rotates, so that the cone-shaped portion pushes the followers 96 and the cylinders 108 connected thereto against the tensile band 110. Unless otherwise stated, either the spring-loaded piston/cylinder arrangement or the band arrangement can be used with any of the embodiments for the cams described herein.

Figure 7:
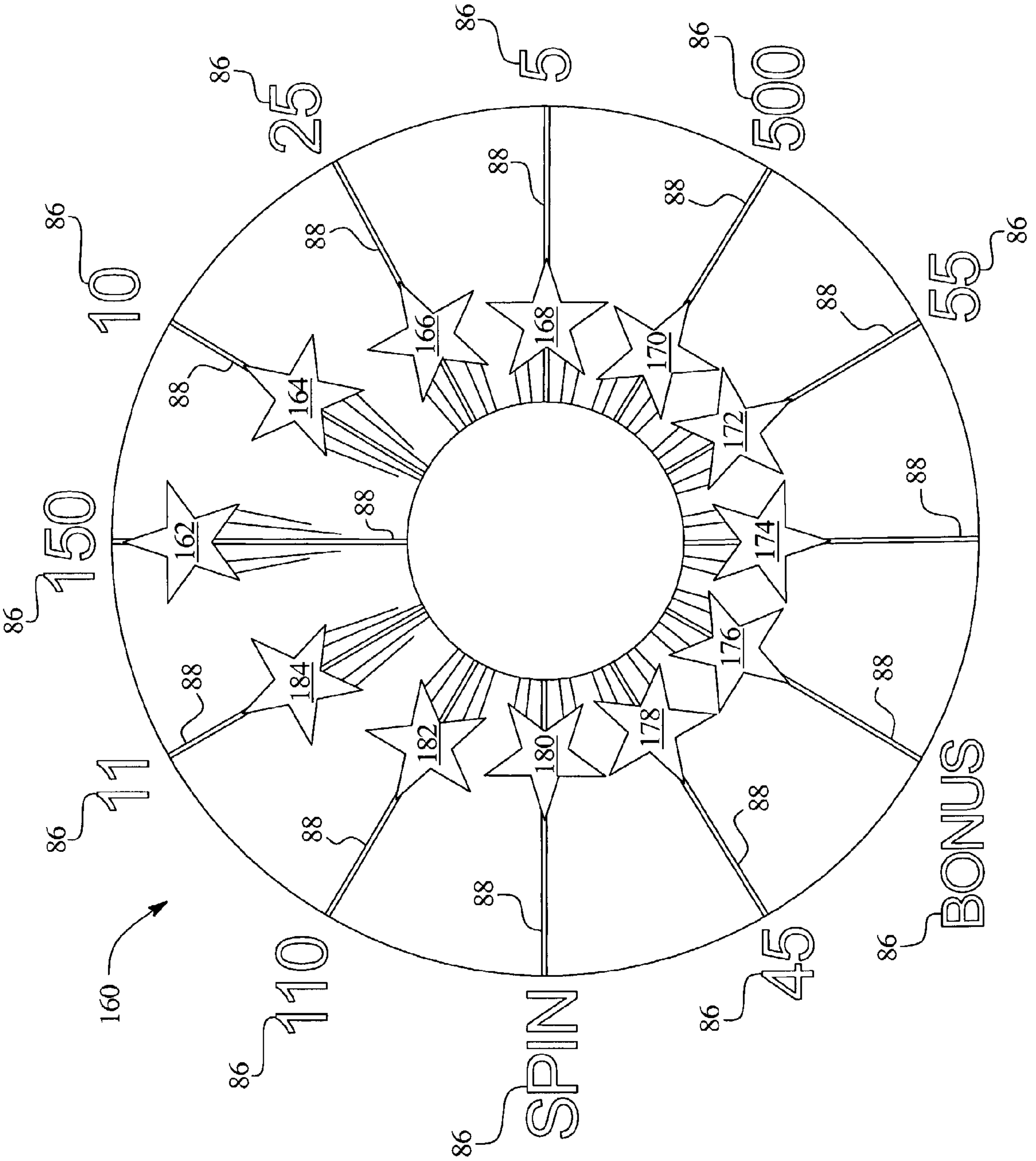
FIG. 7 is a front elevation view of an alternative display with multiple radially translating indicators of the present invention.
Figure 8:
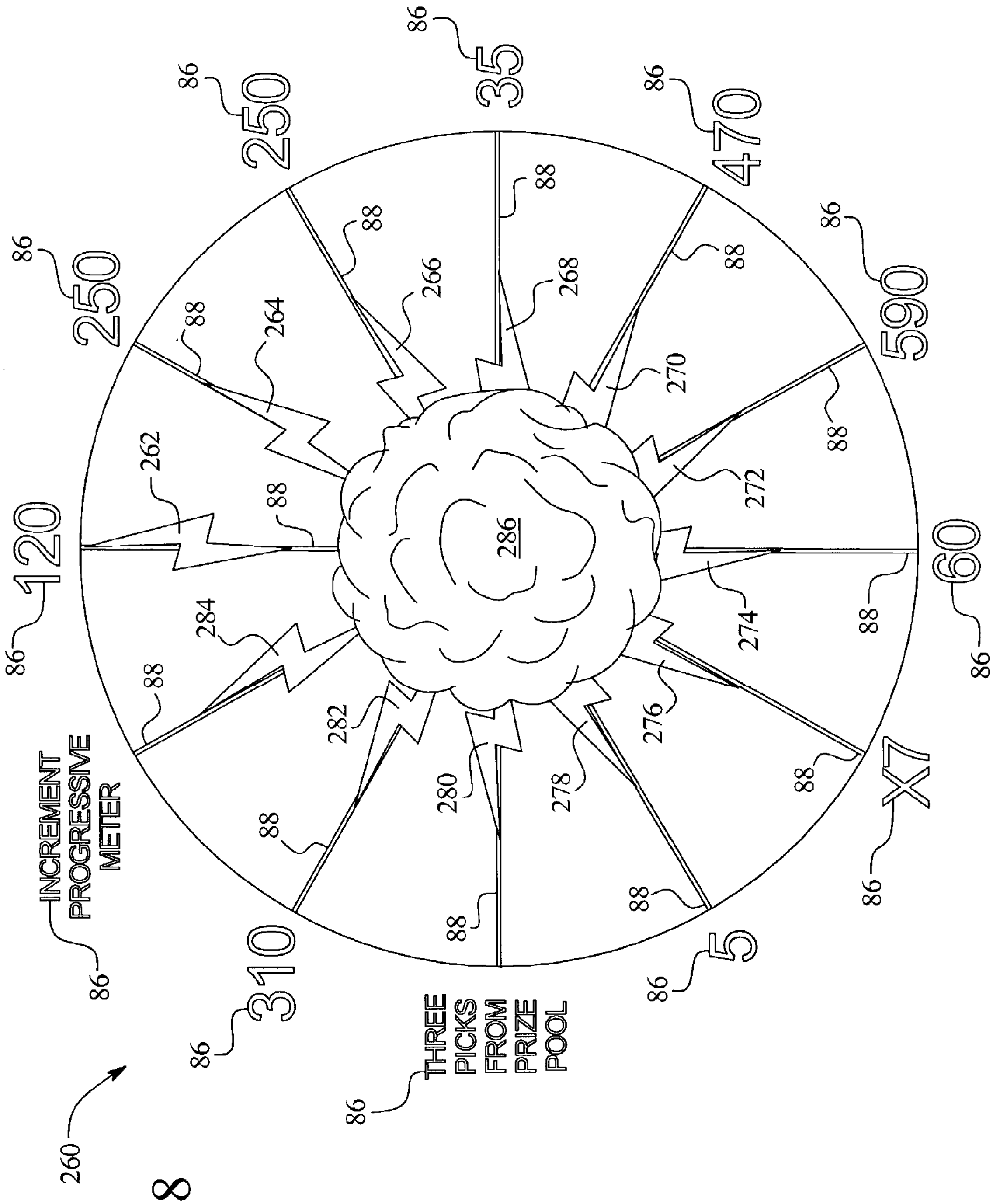
FIG. 8 is a front elevation view of another alternative display with multiple radially translating indicators of the present invention.

Referring now to FIGS. 7 and 8, various embodiments of the displays of the present invention are illustrated. FIG. 7 illustrates an alternative display 160, which in an embodiment is provided in the upper display area 32 of the gaming device 10. As discussed above, display 160 can alternatively be provided on the top of gaming device 10. The display 160 includes star-shaped indicators 162 to 184 that each translates radially along slots 88 towards and away from respective symbols 86. Not only does the device 160 illustrate that the indicators 162 to 184 can take on any shape or form desired by the implementor, device 160 also illustrates that the symbols 86 may be distributed in any suitable manner and order desired by the implementor and can include various forms. Certain symbols illustrated on device 160 are numbers, which can represent various different amounts such as a number of base game credits, multipliers, a number of picks from a prize pool, etc. The display 160 also contains the symbols 86 of "SPIN" and "BONUS", which provide other types of benefits to the player, such as free games or entry into a bonus round.

The display 260 of FIG. 8 illustrates still a further alternative set of indicators 262 to 284 that have the shape of lightning bolts. The indicators 262 to 284 may be combined with other visual display objects, such as the cloud 286. The lightening bolts also travel along radially disposed slots 88 towards various different types of awards 86. The display 160 of FIG. 7 and the display 260 of FIG. 8 can each use the spring-loaded piston/cylinder mechanism illustrated in connection with FIG. 4 or the band embodiment illustrated in connection with FIG. 6. Further, either the display 160 or the display 260 can employ a smoothly contoured cam or employ a cam having protrusions and indentations, e.g., a wiggle cam, on a portion or all of the contour of the cam.

Figure 9:
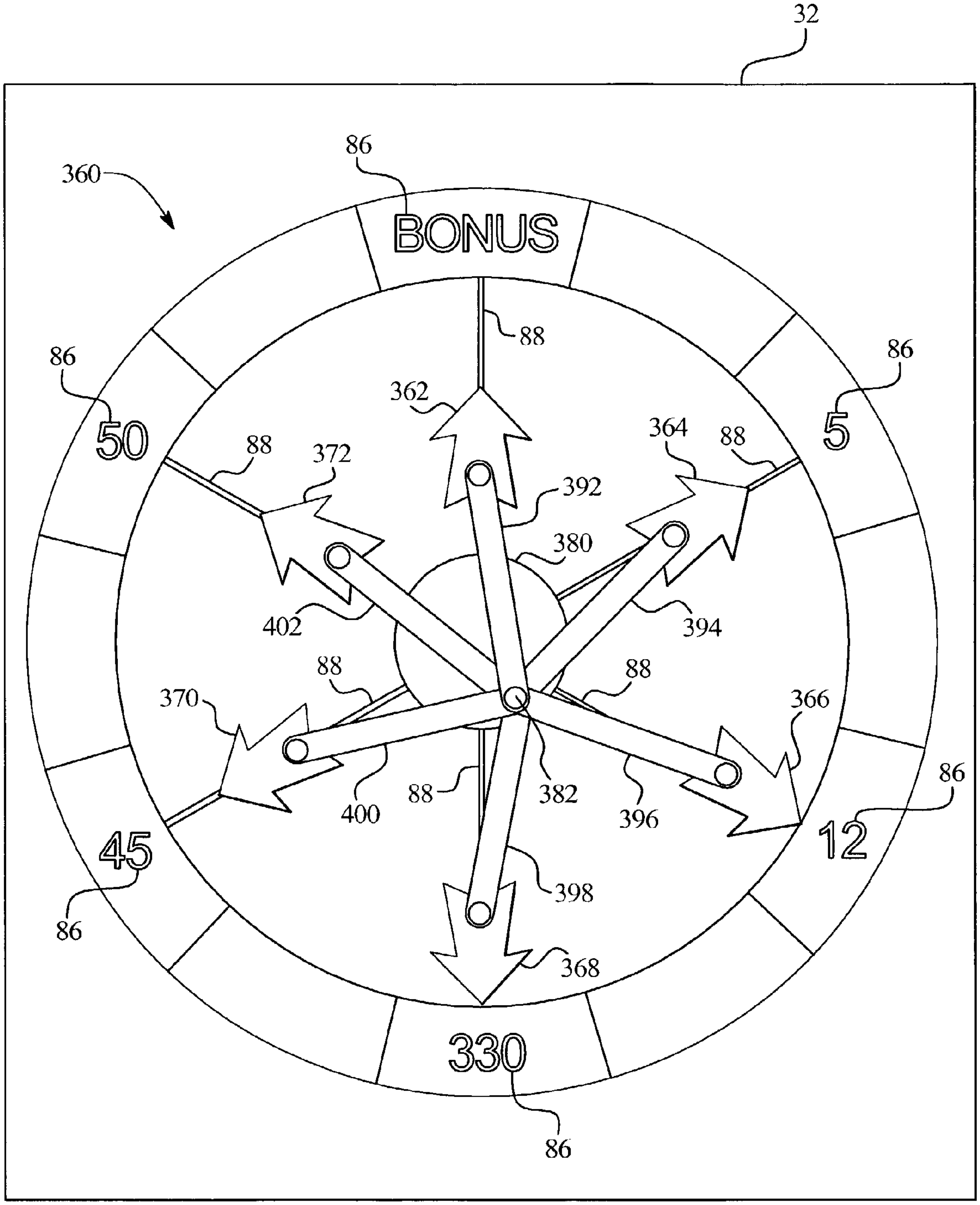
FIG. 9 is a front elevation view of the display having an alternative cam arrangement for driving the multiple translating indicators of the present invention.
Figure 10:
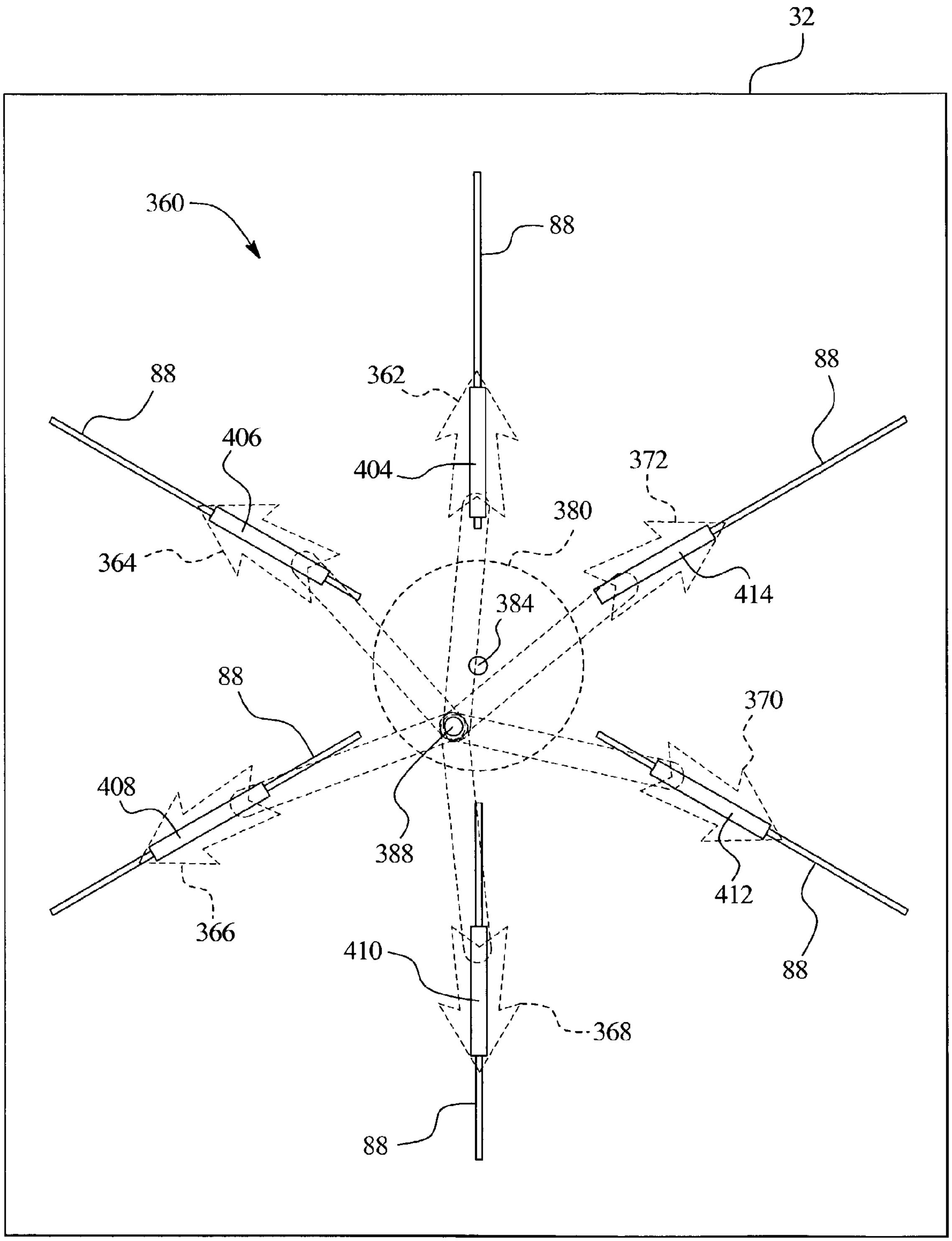
FIG. 10 is a rear elevation view of the display having the alternative cam arrangement of FIG. 9.

Referring now to FIGS. 9 and 10, an alternative arrangement for driving the indicators of the present invention is illustrated by the display 360. The display 360 includes many of the same components discussed above, including the radially disposed slots 88, a number of indicators 362 through 372, which ride along the slots 88 and point towards a number of symbols 86. The indicators 362 to 372 can have any of the shapes discussed above. The symbols 86 can have any of the forms and amounts discussed above.

The display 360 does not include a spring-loading or banded mechanism as described above. The display 360 instead uses a cam 380 and an off-center connection point 382. The off-center connection point 382 rotates circumferentially at a predetermined radius about the center of the cam 380.

The off-center connection point 382 is pivotally connected to members 392 to 402. Each of the members 392 to 402 is pivotally connected to one of the indicators. In particular, the member 392 is pivotally connected to the off-center connection point 382 and the indicator 362. The member 394 is pivotally connected to the point 382 and the indicator 364. The member 396 is pivotally connected to the point 382 and the indicator 366. The member 398 is pivotally connected to the point 382 and the indicator 368. The member 400 is pivotally connected to the point 382 and the indicator 370 and the member 402 is pivotally connected to the point 382 and the indicator 372.

When the cam 380 rotates about its center 384, the off-center connection point 382 of the cam 380 drives the members 392 to 402 in different directions. In the illustrated embodiment, the connection point 382 of the cam 380 pushes the member 398 the furthest outwardly of any of the indicators 362 to 372, wherein the indicator 368 extends towards the symbol 86 of three hundred thirty. The display 360 currently indicates that if an award provided to the player at this instant in time would be the value of three hundred thirty.

The connection point 382 also pushes the members 396 and 400 and their corresponding indicators 366 and 370 slightly less than the indicator 368 towards the symbols 86 of twelve and forty-five, respectively. The connection point 382 pulls the members 402, 392 and 394 and the indicators 372, 362 and 364, respectively, away from the symbols 86 of fifty, "BONUS" and five, respectively. It should therefore be appreciated that the indicators 362 to 372 are in virtual constant translating motion towards and away from the symbols 86.

FIG. 10 illustrates the view from inside of the panel of the upper display area 32 for the display 360. It should be appreciated that the mechanical linkage of the display 360 does not include or require spring-loaded piston/cylinders or a stretchable band placed about the connectors that connect or hold the indicators in place. FIG. 10 illustrates that the display 360 includes connectors 404 to 414 that hold the indicators 362 to 372, respectively, in place along the slots 88. The indicators are illustrated in phantom because the actually appear on the front face or other side of the panel of the upper display area 32.

The center 384 of cam 380 has a camshaft 384 that extends through the panel of upper area 32 and couples, e.g., via a motor coupler having offset compensation, to a motion producing device 58, such as a stepper motor. The stepper motor (not illustrated) precisely controls the acceleration, velocity and position of the off-center connection point 382 with respect to a reference, such as zero degrees.

In one embodiment, the gaming device 10 provides a benefit to the player based on at least one of the symbols 86 to the player when the display rotates and then stops rotating. The indicator closest to its respective symbol designates the symbol that gaming device 10 provides to the player. For example, in FIG. 9, the indicator 368 indicates that the symbol 86 of "three hundred thirty" is provided to the player. In FIG. 3, the indicator 74 indicates that the symbol 86 of "six" is provided to the player. In FIG. 7, the indicator 162 indicates that the symbol 86 of "one hundred fifty" is provided to the player. Likewise, in FIG. 8, the indicator 262 indicates that the symbol 86 of "one hundred twenty" is provided to the player.

It should be appreciated that in an alternative embodiment, the indicators could indicate multiple different symbols and the awards associated with the multiple indicated symbols could be provided to the player. It should also be appreciated that one or more of the symbols could represent a triggering event for another game such as a secondary game, which is operable to provide further awards to a player. This secondary game could be in any suitable form such as a wheel, reel or other display device.

Gaming device 10 includes a method of determining or knowing which indicator is currently pointing furthest, second furthest, third furthest, etc., towards its respective symbol 86 when the motion device 58, e.g., the stepper motor stops moving. In an embodiment, a random generation device stored in the memory device 40 generates the outcome randomly for the player before the motion producing device 58 begins to move. The displays run a sequence that is fun and exciting for the player and which indicate over time each of the various different symbols 86. The sequence ends with the randomly generated symbol being indicated.

In each of the cam driven embodiments described herein, the processor 38 knows, based on the position of the cam, i.e., the position of a motor shaft, which indicator is currently in the "indicating" i.e., award yielding, position with respect to its associated symbol. The stepper motors in an embodiment operate in an open loop system, wherein the processor relies on the fact that the stepper motor actually moves or rotates the amount commanded by a number of steps sent as a high-level communication from the processor 38 to the motion controller 56 and then as motor current outputs from the motion controller 56 to the motion producing device 58.

In an alternative embodiment, the processor 38 operates in a closed loop environment. Here, the stepper motor can include or provide encoder feedback, which senses the rotational position of the motor shaft with respect to a reference such as zero degrees. The encoder feeds this information back into the processor, so that the processor 38 does not have to rely on the motor actually doing what it is told to do. The encoder feedback can also be used by the processor 38 to compensate for errors in the system. That is, if the processor 38 learns that the motor shaft has not turned to the proper position, processor 38 can calculate and send a command of a number of steps or pulses needed to turn the stepper motor shaft to the proper position.

Gaming device 10 provides, in various embodiments, other types of feedback to the processor 38 other than encoder feedback. For example, one or more sensors, such as magnetic sensors, capacitive sensors, proximity sensors, light-emitting and receiving sensors, etc., can be placed at various points on the displays to sense the presence of a designated portion of the cam or one or more of the indicators. The sensed position provides feedback to the processor 38, so that the processor 38 knows that the arrangement of indicators is in a particular configuration. The sensors can also be placed on the inside or outside of the panel of the upper display area 32 and sense various different components, such as the connectors that hold the indicators within the slots 88. The connectors provide a convenient place that is out-of-sight and which also indicates accurately the position of the indicators.

Figure 11:
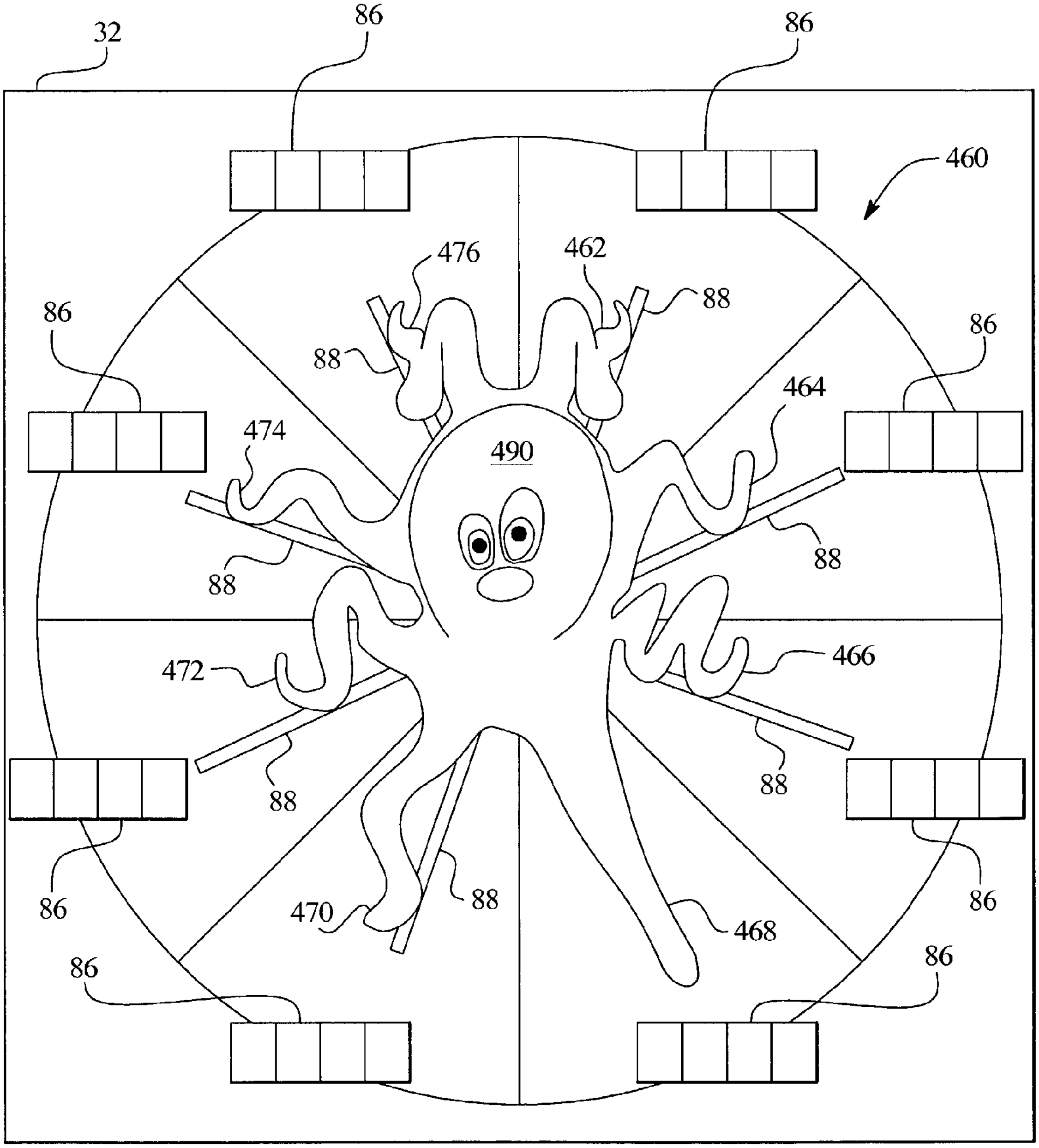
FIG. 11 is a front elevation view of one embodiment of a display having multiple radially translating three-dimensional indicators of the present invention.

Referring now to FIGS. 11 through 14, one preferred embodiment is illustrated by the display 460. As illustrated in FIG. 11, the display 460 includes the symbols 86 and the slots 88 as described above, including any of the variations and configurations of same. The display 460 also includes indicators 462 to 476 that slide in a radially translational manner along the slots 88 as described herein. The indicators 462 to 476 form part of a three-dimensional object 490. The indicators 462 to 476 are each three-dimensional legs of the object 490, which in the illustrated embodiment is an octopus. The three-dimensional indicators can have any shape desired by the game implementor and operate with any type of object 490. The three-dimensional object 490 adds fun and excitement to gaming device 10.

Figure 12:
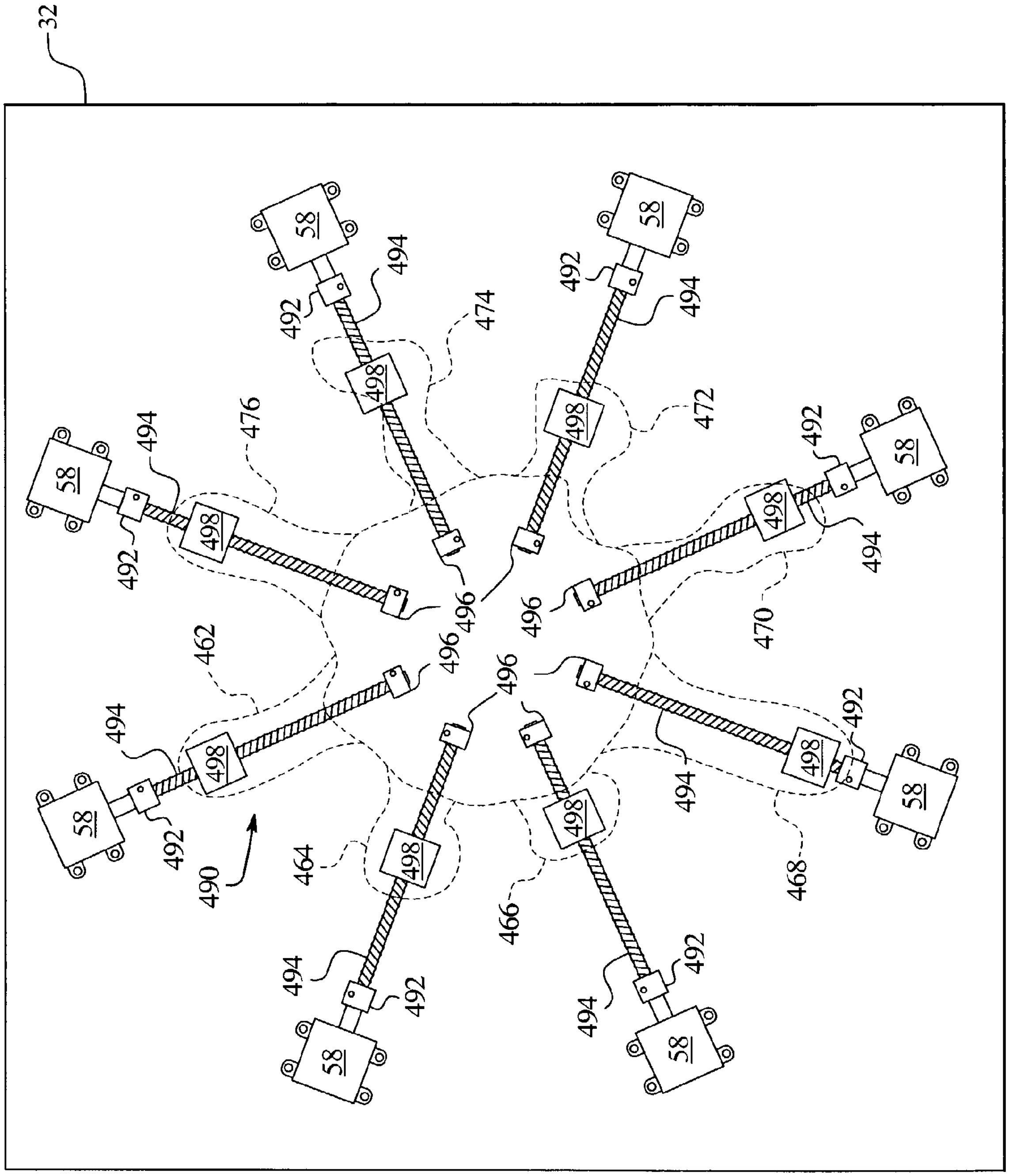
FIG. 12 is a rear elevation view of the display of FIG. 11 illustrating an alternative embodiment that provides independent control of each of the three-dimensional multiple radially extending indicators of the present invention.

Referring now to FIG. 12, the reverse side of the panel of the upper display area 32 is illustrated showing the mechanical configuration of the display 460. Each of the embodiments described to this point has included a cam arrangement in which the motion of any one of the indicators is related mathematically to the motion of each other indicator, i.e., by the mathematical expression of the shape of the cam. FIG. 12, on the other hand, illustrates that the display 460 includes indicators 462 to 476, illustrated in phantom that do not move due to the motion of a cam. Instead, a separate motion producing device 58 is provided for each indicator. In the illustrated embodiment, the motion producing devices 58 are each illustrated as rotational stepper motors. In alternative embodiments, the devices 58 can be other types of motion producing devices, such as linear actuators or linear stepper actuators.

For each indicator 462 to 476, the motion producing device 58 is connected, for example by a motor coupler 492, to a lead screw 494. The motor couplers 492 can each have spring portions that compensate for misalignment between the motion producing devices 58 and the lead screw 494. The lead screw in an embodiment is steel or stainless steel and is rotated by the motion producing device 58. The opposite end of each lead screw 494 from the motor coupler 492 is connected to a bearing 496. The bearings 496 mount to the panel of the upper display area 32 or to a structural member of same.

When the motion producing devices 58 turn, the lead screws 494 turn to move connectors 498 threaded onto each lead screw 494. If the lead screw is turned in one direction, connector 498 moves linearly and radially in a first direction along lead screw 490. If the lead screw 494 is turned in the opposite direction, connector 498 moves in the opposite direction along the lead screw 494 in a radial, translational direction.

The connectors 498 attach to the indicators 462 through 484 through the slots 88 in the panel of the upper display area 32 via co-connections not illustrated in FIG. 12. The processor 38 and memory device 40 can store any type of motion control program that enables each of the indicators 462 to 476 to be operated individually, i.e., moved in or out individually. The effect is, for example, with the object 490, an octopus with crazy legs that move in an out, seemingly with no pattern.

The display 460 provides a highly entertaining three-dimensional visual display that also has a functional component. For example, in the illustrated embodiment of FIGS. 11 and 12, the indicator 468 is outstretched and is currently in an indicating position with respect to its symbol 86. Other indicators are moved in tightly towards the body of the object 490. The remaining indicators are positioned at intermediate positions. Each of these indicators may be currently stopped or moving in and out based on the direction of the rotation of the motion producing device 58 and the associated lead screw 494. Alternatively, multiple ones of the indicators may become fully outstretched wherein gaming device 10 provides an outcome based on multiple ones of the symbols 86.

Figure 13:
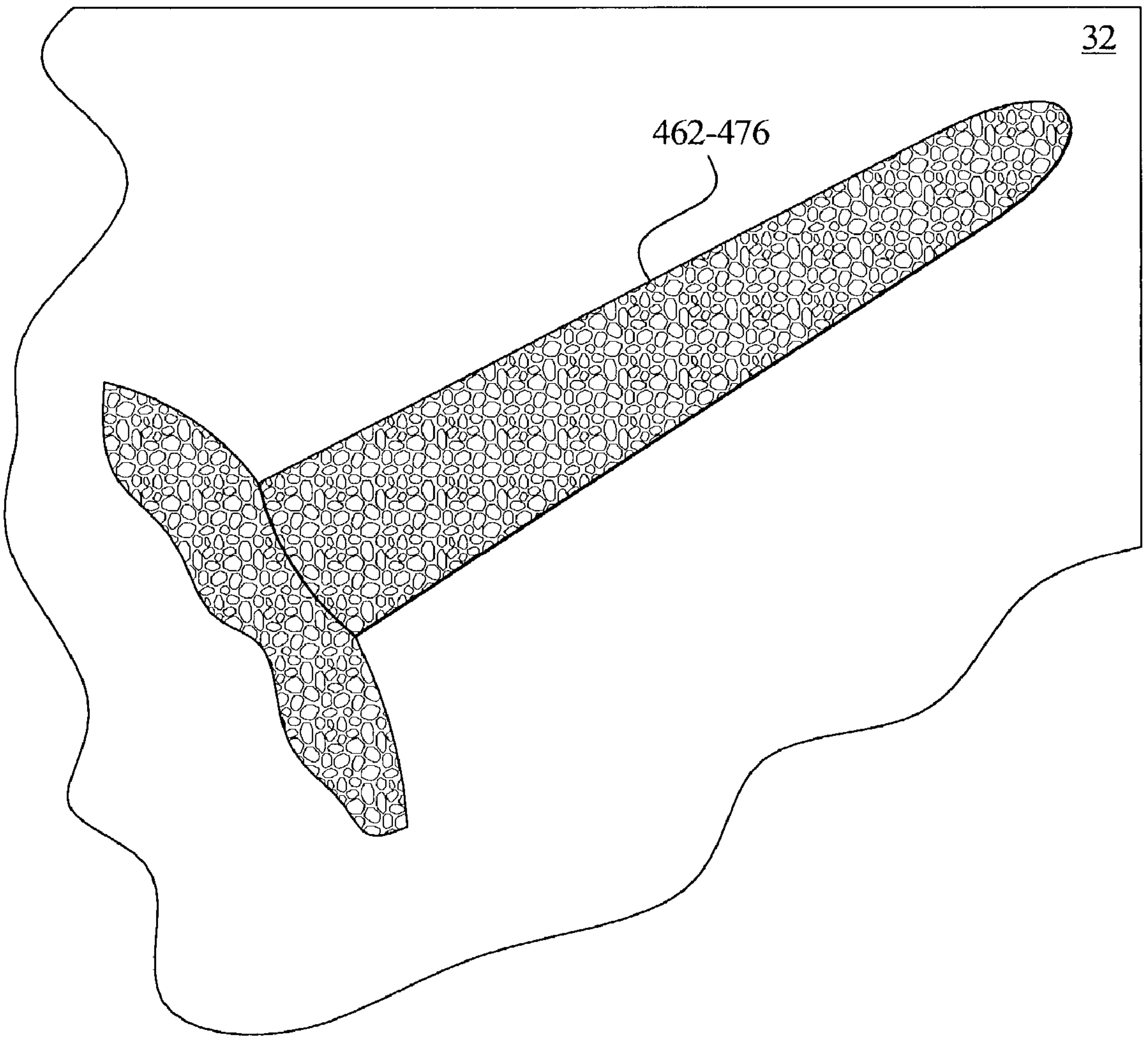
FIG. 13 is an elevation view of one embodiment of a three-dimensional indicator of the present invention in a fully extended position.
Figure 14:
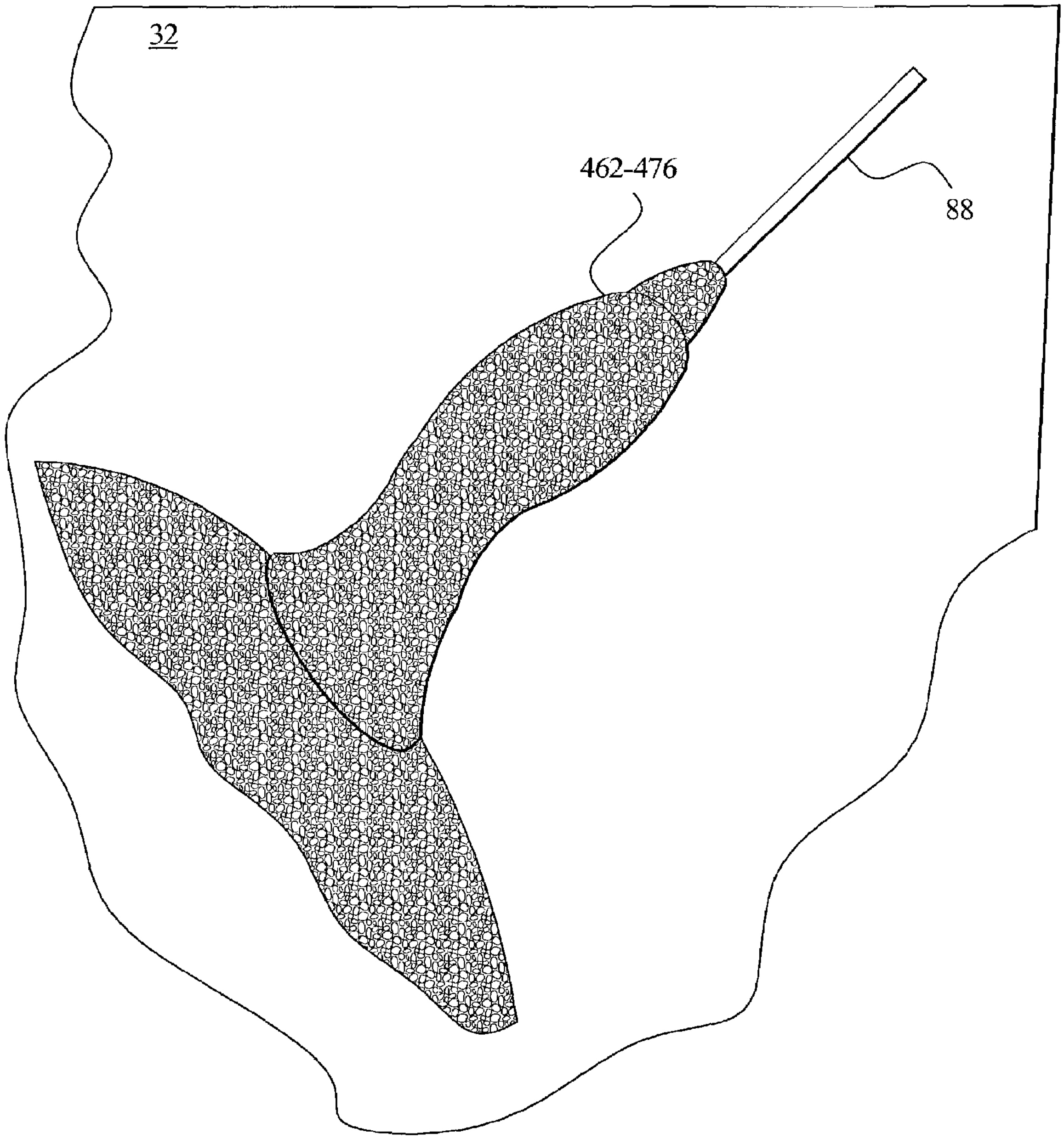
FIG. 14 is an elevation view of one embodiment of a three-dimensional indicator in a semi-retracted position.

FIGS. 13 and 14 illustrate one of the flexible indicators 462 to 476 in an extended or outstretched position and in a retracted position, respectively. The view of FIGS. 13 and 14 is from the front of the gaming device, i.e., from the front panel of the upper display area 32. In FIG. 14, when the flexible indicator is retracted, a portion of the slot 88 is seen within which the co-connector to the connector 498 travels along a path in line with the lead screw 494. FIG. 13 illustrates that when the indicator 462 to 476 is in a fully extended position, the tip of the indicator extends past the slot 88 so that the slot 88 is not seen. In one embodiment, the slot 88 is made relatively thin so that it is difficult to see. In an alternative embodiment, the slot is covered from the rear by a suitable covering such as a foam covering or brushes.

Figure 15:
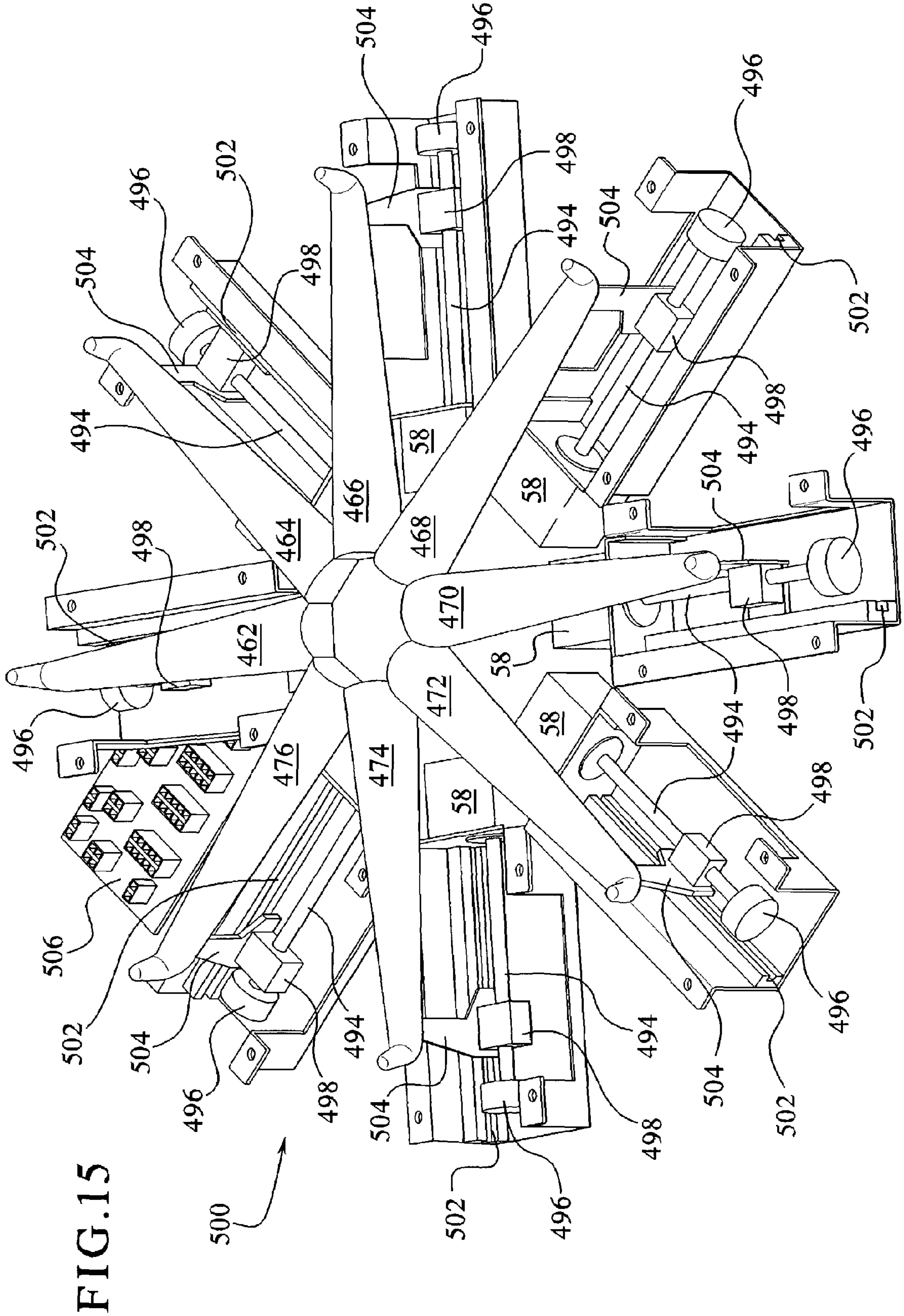
FIG. 15 is a perspective view of the independently controlled three-dimensional indicator embodiment of the present invention illustrating, among other items, the connectors that attach the motion producing devices to the indicators.

Referring now to FIG. 15, a perspective view of the independently controlled display 460 having the three-dimensional indicators of the present invention is illustrated. FIG. 15 illustrates the assembly of the display 460 without the panel of the upper display area 32 or the slots 88 provided in same and provides a view of the connectors 504 previously discussed but not illustrated previously. The display 460 includes the eight three dimensional, independently controlled, indicators 462 to 476 shown in FIGS. 11 and 12. The displays of the present invention can have any practical and desired number of the three-dimensional indicators. Indicators 462 to 476 of the display 460 expand and contract substantially as illustrated in FIGS. 13 and 14. In FIG. 15, each of the indicators 462 to 476 is shown extended fully for convenience.

A separate motion producing device 58 or stepper motor is provided for each indicator 462 to 476. In the illustrated embodiment, each of the rotational motion producing devices are attached via a suitable coupler or other attachment device to a lead screw or linear actuator 494, which attaches at the other end to a bearing 496. Each lead screw or linear actuator 494 drives a connector 498. Each connector 498 is slidingly attached to a metal or plastic guide 502. The guide 502 is mounted to the panel of the upper display area 32 (not illustrated) or a structural member thereof. The guide 502 aids the connector 498 in moving radially and translationally within a slot 88 (not illustrated) in the panel. A portion 504 of the connector 498 extends through the slot 88 and is attached to the respective indicator 462 to 476. The portion 504 is formed integrally with or is attached to the remainder of the connector 498. As illustrated, the portion 504 is structurally rigid and strong and at the same time thin so as to be slideable within the respective groove 88.

It should thus be appreciated that the present invention provides wagering gaming devices including one or more flexible indicators which are extendable and retractable to indicate symbols such as award or credit symbols. It should further be appreciated that the flexible indicators can move simultaneously, sequentially, and in any suited positions from fully extended to fully retracted. Further, in alternative embodiments of the present invention, the symbols could indicate any suitable game function, triggering event or game events such as an award of credits, a modifier such as a multiplier, a number of free games or spins, or a bonus or secondary game.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A wagering gaming device comprising:

a game;

a cabinet;

a display supported by the cabinet and including a plurality of displayed symbols;

a plurality of mechanical indicators, each indicator individually associated with only one of the symbols on the display and moveable towards and away from said symbol and a common point associated with said plurality of mechanical indicators;

a processor programmed for a play of the game to:

randomly determine at least one of the symbols;

cause a plurality of mechanical indicators to each move toward and away from the displayed symbols to indicate said symbols;

thereafter cause at least one of the mechanical indicators to move toward and indicate the at least one randomly determined symbol; and provide an outcome based on the randomly determined symbols indicated by its associated indicator.

2. The wagering gaming device of claim 1, wherein the plurality of indicators each have a fully extended position and a fully retracted position.

3. The wagering gaming device of claim 2, wherein each of the indicators is flexible between the fully extended position and the fully retracted position.

4. The wagering gaming device of claim 1, which includes a processor operable to provide an award to a player based on the outcome.

5. The wagering gaming device of claim 4, wherein an outcome producing symbol is associated with the indicator that is closest to its associated symbol with respect to the other indicators when the indicators stop moving.

6. The wagering gaming device of claim 1, wherein the indicators are biased to follow a rotating surface of a cam.

7. The wagering gaming device of claim 6, wherein the surface is smooth.

8. The wagering gaming device of claim 6, wherein the surface includes at least one protrusion.

9. The wagering gaming device of claim 6, wherein the surface includes at least one indentation.

10. The wagering gaming device of claim 1, which includes an eccentric member operable to cause the indicators to move toward the symbols.

11. The wagering gaming device of claim 1, wherein the symbols are positioned around the indicators.

12. The wagering gaming device of claim 1, wherein the indicators are moved by an actuator.

13. The wagering gaming device of claim 12, wherein the actuator includes a motor which is operable to cause a cam to rotate and move the indicators to a position based on a randomly generated outcome.

14. The wagering gaming device of claim 1, wherein the cabinet includes a panel, the symbols and indicators are displayed on an exterior side of the panel and at least one actuator coupled to the indicators is positioned on an interior side of the panel.

15. The wagering gaming device of claim 14, which includes a plurality of independently operated actuators, each actuator coupled to one of the indicators.

16. A wagering gaming device comprising:

a game; and a display that operates in conjunction with the game, the display including a plurality of displayed symbols and a plurality of mechanically independently operable moveable indicators individually associated with only one of the symbols, said moveable indicators positionable to a fully extended position associated with each respective symbol and a fully retracted position, wherein the fully retracted position is associated with a common point associated with said plurality of mechanical indicators;

a processor programmed for a play of the game to:

randomly determine at least one of the indicators;

cause the plurality of mechanical indicators to each move toward and away from the displayed symbols to indicate said symbols;

thereafter cause the at least one randomly determined indicator to move toward and indicate its associated symbol;

cause the mechanical indicators to stop moving; and provide an outcome based on the at least one randomly determined indicator that is in the fully extended position relative to its associated symbol when the indicators stop moving.

17. The wagering gaming device of claim 16, wherein the game is selected from the group consisting of: slot, poker, blackjack and keno.

18. The wagering gaming device of claim 16, wherein the outcome is in a secondary game associated with the game.

19. The wagering gaming device of claim 16, wherein the outcome is based on a plurality of indicators that are in a fully extended position relative to their respective associated symbols when the indicators stop moving.

20. The wagering gaming device of claim 16, wherein the indicators are driven by a cam.

21. The wagering gaming device of claim 20, wherein the cam is operably connected to spring loaded followers.

22. The wagering gaming device of claim 20, wherein the cam is operably connected to spring loaded followers, the followers biased collectively by a tensile band.

23. The wagering gaming device of claim 16, wherein the indicators are each coupled operatively to a separate actuator.

24. A wagering gaming device comprising:

a game;

a cabinet;

a display supported by the cabinet, said display including a plurality of displayed symbols;

a plurality of indicators each individually associated with only one of the symbols;

a mechanism associated with each of the indicators;

a processor programmed for a play of the game to:

randomly determine at least one of the symbols;

cause the mechanisms to cause a plurality of the indicators to each move towards and away from their associated symbols and a common point associated with said indicators to indicate said symbols;

thereafter cause at least one of the mechanical indicators to move toward and indicate the at least one randomly determined symbol; and provide an outcome based on the randomly determined symbols indicated by its associated indicator.

25. The wagering gaming device of claim 24, wherein the outcome indicating symbol is the symbol most prominently indicated by one of the indicators when the indicators stop moving.

26. The wagering gaming device of claim 24, wherein the mechanisms each operate with a processor controlled motion producing device.

27. A method of operating a wagering gaming device comprising the steps of:

(a) displaying a plurality of mechanical indicators, each indicator associated with only one of a plurality of symbols;

(b) executing an instruction by a processor to cause:

(i) cause a random determination of at least one of the indicators, (ii) cause at least one of the indicators to move a first distance toward and away from its associated symbol and a common point associated with said plurality of indicators to indicate its associated symbol, (iii) thereafter cause the randomly determined indicator to move a second distance toward its associated symbol and away from said common point; and (c) providing an outcome to a player based on the randomly determined indicator which is closest to its associated symbol.

28. The method of claim 27, which includes sequentially moving a plurality of the indicators toward and away from their associated symbols until stopping the indicators.

29. The method of claim 27, which includes simultaneously moving at least two of the indicators toward and away from their associated symbols.

30. The method of claim 27, which includes rotating a cam to cause the indicators to move.

31. The method of claim 27, which includes causing independent actuators to independently move the indicators.

32. A wagering gaming device comprising:

a game; and a display that operates in conjunction with the game, the display including a plurality of displayed symbols and a plurality of mechanically independently operable moveable indicators individually associated with only one of the symbols, said moveable indicators each positionable to a fully extended position and a fully retracted position, wherein the indicators each attach to a single member, the member driven around a center point circumnferentially; and a processor programmed for a play of the game to:

randomly determine at least one indicator;

cause a plurality of mechanical indicators to each move toward and away from the displayed symbols to indicate said symbols;

thereafter cause the randomly determined indicator to move toward and indicate its associated symbol;

cause the plurality of mechanical indicators to stop moving; and provide an outcome based on the at least one randomly determined indicator that is in the fully extended position relative to its associated symbol when the indicators stop moving.

33. A wagering gaming device comprising:

a game;

a cabinet;

a display supported by the cabinet and including a plurality of displayed symbols;

a plurality of mechanical indicators, each indicator individually associated with only one of the symbols on the display and moveable towards and away from said symbol and a common point associated with said plurality of mechanical indicators, at least a first one of the mechanical indicators being simultaneously movable towards its associated symbol while at least a second one of the mechanical indicators moves away from its associated symbol;

a processor programmed for a play of the game to:

randomly determine at least one of the symbols;

cause a plurality of mechanical indicators to each move toward and away from the displayed symbols to indicate said symbols; and thereafter cause at least one of the mechanical indicators to move toward and indicate the at least one randomly determined symbol; and provide an outcome based on the randomly determined symbol and indicated by its associated indicator.

* * * * *

UNITED STATES PATENT AND TRADEMARK OFFICE

CERTIFICATE OF CORRECTION

PATENT NO. : 7,258,609 B2 Page 1 of 1
APPLICATION NO. : 10/243462
DATED : August 21, 2007
INVENTOR(S) : Dennis Nordman et al.

It is certified that error appears in the above-identified patent and that said Letters Patent is hereby corrected as shown below:

IN THE CLAIMS:

In Claim 27, column 16, line 34, change "to cause:" to --to:--.

Signed and Sealed this

Twenty-seventh Day of May, 2008

JON W. DUDAS
*Director of the United States Patent and Trademark Office*